United States Patent
Kurosawa et al.

(10) Patent No.: US 10,286,501 B2
(45) Date of Patent: May 14, 2019

(54) LASER WELDING APPARATUS, PREVENTIVE MAINTENANCE METHOD FOR REACTOR INTERNAL OF NUCLEAR POWER PLANT, AND LASER CUTTING APPARATUS

(71) Applicants: Hitachi-GE Nuclear Energy, Ltd., Hitachi-shi, Ibaraki (JP); Bab-Hitachi Industrial Co., Kure-shi, Hiroshima (JP)

(72) Inventors: Koichi Kurosawa, Hitachi (JP); Shinya Ohmori, Hitachi (JP); Ren Morinaka, Hitachi (JP); Kazuhiro Nitta, Kure (JP); Yoichi Mahara, Kure (JP); Keigo Uchiyama, Kure (JP)

(73) Assignee: Hitachi-GE Nuclear Energy, Ltd., Hitachi-shi (JP)

( * ) Notice: Subject to any disclaimer, the term of this patent is extended or adjusted under 35 U.S.C. 154(b) by 1206 days.

(21) Appl. No.: 14/450,993

(22) Filed: Aug. 4, 2014

(65) Prior Publication Data

US 2015/0048059 A1 Feb. 19, 2015

(30) Foreign Application Priority Data

Aug. 19, 2013 (JP) ................. 2013-169486

(51) Int. Cl.
*B23K 9/04* (2006.01)
*B23P 6/04* (2006.01)
(Continued)

(52) U.S. Cl.
CPC ............ *B23P 6/04* (2013.01); *B23K 26/0648* (2013.01); *B23K 26/082* (2015.10);
(Continued)

(58) Field of Classification Search
CPC .............. B23K 26/0648; B23K 26/082; B23K 26/0876; B23K 26/127; B23K 26/342; B23P 6/04; G21C 13/036; G21C 17/017
(Continued)

(56) References Cited

U.S. PATENT DOCUMENTS 5,554,837 A     9/1996  Goodwater et al.
6,593,540 B1 *  7/2003  Baker ................ B23K 26/0096
                                        219/121.63
(Continued)

FOREIGN PATENT DOCUMENTS

JP      6190581      *  7/1994
JP      9-506039 A      6/1997
(Continued)

OTHER PUBLICATIONS

Chida, Itaru et al., "Study of Laser Beam Welding Technology for Nuclear Power Plants," Japan Machinery Society Essays (Edition B), Mar. 2012, pp. 73-77, vol. 78, No. 787.
(Continued)

*Primary Examiner* — Dana Ross
*Assistant Examiner* — Joseph Iskra
(74) *Attorney, Agent, or Firm* — Crowell & Moring LLP

(57) ABSTRACT

The laser welding apparatus includes a welding head and a welding head scanning apparatus. A collimate lens installed on a head body of the welding head is arranged opposite to an end face of optical fibers. The welding head includes only the collimate lens as a lens and the length is shortened. A laser generated by a laser oscillator is introduced into the optical fiber, enters the collimate lens, and then is converted to a parallel beam by the collimate lens. The laser of a parallel beam is irradiated on a surface a welding portion of the welding object through a laser path and the surface of the welding portion is melted. Metallic powder is jetted from
(Continued)

powder feed paths formed in a head body to the melted portion and build-up welding is performed on the surface of the welding portion.

2 Claims, 15 Drawing Sheets

(51) Int. Cl.
| | |
|---|---|
| *B23K 26/12* | (2014.01) |
| *B23K 26/06* | (2014.01) |
| *G21C 17/017* | (2006.01) |
| *B23K 26/342* | (2014.01) |
| *B23K 26/082* | (2014.01) |
| *B23K 26/08* | (2014.01) |
| *G21C 13/036* | (2006.01) |

(52) U.S. Cl.
CPC ........ *B23K 26/0876* (2013.01); *B23K 26/127* (2013.01); *B23K 26/342* (2015.10); *G21C 17/017* (2013.01); *G21C 13/036* (2013.01)

(58) Field of Classification Search
USPC ... 219/76.14, 121.6, 121.63, 121.64, 121.65, 219/121.66
See application file for complete search history.

(56) References Cited

U.S. PATENT DOCUMENTS

| | | | |
|---|---|---|---|
| 2009/0291197 A1* | 11/2009 | Bartels | B23K 26/02 427/8 |
| 2011/0051878 A1 | 3/2011 | Ohmori et al. | |
| 2012/0261393 A1* | 10/2012 | Nowotny | B23K 26/043 219/121.63 |
| 2014/0188094 A1* | 7/2014 | Islam | A61B 18/203 606/7 |

FOREIGN PATENT DOCUMENTS

| | | |
|---|---|---|
| JP | 2001-79663 A | 3/2001 |
| JP | 3469185 B2 | 11/2003 |
| JP | 2004-255410 A | 9/2004 |
| JP | 2006-95559 A | 4/2006 |
| JP | 2007-50446 A | 3/2007 |
| JP | 2007-216235 A | 8/2007 |
| JP | 4178027 B2 | 11/2008 |
| JP | 2010-276491 A | 12/2010 |
| JP | 2011-52966 A | 3/2011 |
| WO | WO 02/11151 A1 | 2/2002 |

OTHER PUBLICATIONS

French-language Written Opinion and Search Report issued in counterpart French Application No. 1457568 dated Jul. 12, 2017 with English translation (Eleven (11) pages).

* cited by examiner

LASER WELDING APPARATUS, PREVENTIVE MAINTENANCE METHOD FOR REACTOR INTERNAL OF NUCLEAR POWER PLANT, AND LASER CUTTING APPARATUS

CLAIM OF PRIORITY

The present application claims priority from Japanese Patent application serial no. 2013-169486, filed on Aug. 19, 2013, the content of which is hereby incorporated by reference into this application.

BACKGROUND OF THE INVENTION

Technical Field

The present invention relates to a laser welding apparatus, a preventive maintenance method for a reactor internal structure of a nuclear power plant, and a laser cutting apparatus and more particularly to a laser welding apparatus, a preventive maintenance method for a reactor internal structure of a nuclear power plant, and a laser cutting apparatus which are suitably applicable to the nuclear power plant.

Background Art

Conventionally, in a preventive maintenance operation of a reactor internal of a nuclear power plant, an automatic TIG welding or a laser welding described in Japanese Patent Laid-open No. 2010-276491 and Japanese Patent No. 3469185 is used as a welding method. In each aforementioned welding, a method of melting a wire fed to a welding portion of a welding object using a welding apparatus having a wire feed function or a method of setting a sleeve beforehand in the welding portion and melting it with non-filler is used.

High-quality welding can be performed by the TIG welding and the laser welding, though as described in Japanese Patent Laid-open No. 2010-276491 and Japanese Patent No. 3469185, it is necessary to keep the angle of a welding torch relative to the welding surface in a state as close to perpendicular as possible. For this reason, a drive mechanism of a welding apparatus scanner of scanning the welding apparatus needs to include a complicated mechanism for adjusting posture of the welding torch.

In contrast, as described in Japanese Patent Laid-open No. 2004-255410, in a head portion ahead of an optical fiber end portion, a laser welding apparatus having the conventional wire feed function, includes a collimate lens for converting the spread laser beam emitted from the optical fiber to a parallel beam and a condensing lens for condensing the parallel beam from the collimate lens. The laser beam enters the optical fiber from a laser oscillator. A laser irradiation arc welding method is described in Japanese Patent Laid-open No. 2006-95559. This laser irradiation arc welding method uses a welding apparatus including an arc welding head and a laser welding head. The laser welding head includes the aforementioned collimate lens and condensing lens.

A laser welding head for feeding a powder-shape welding material instead of a wire includes a condensing lens for condensing a laser beam together with a power feed apparatus as described in Japanese Patent Laid-open No. 2007-216235. A powder laser welding head described in Japanese Patent Laid-open No. 2007-216235 and a laser welding head described in Japanese Patent Laid-open No. 2004-255410 and Japanese Patent Laid-open No. 2006-95559 respectively, dispose a collimate lens for converting the spread laser beam emitted from an optical fiber to a parallel beam at the front stage of a condensing lens. The parallel beam enters the condensing lens. A laser welding for feeding a powder-shape welding material is described also in Japanese Patent Laid-open No. 2007-50446 and Japanese Patent Application Publication No. 9(1997)-506039.

In a boiling water nuclear power plant, a plurality of control rod drive mechanism housings and a plurality of in-core monitor housings are attached to a bottom head of a reactor pressure vessel passing through the bottom head. Each control rod drive mechanism housing is separately inserted into a plurality of stub tubes attached to the bottom head of the reactor pressure vessel by welding, passes through each stub tube and the bottom head of the reactor pressure vessel, and is attached to each stub tube by welding. Further, each of the in-core monitor housings is also attached to the bottom head of the reactor pressure vessel by welding. Repair operation is performed for the welded portions between the stub tubes and the bottom head of the reactor pressure vessel bottom, the welded portions between the control rod drive mechanism housings and the stub tubes, and the welded portions between the in-core monitor housings and the bottom head of the reactor pressure vessel. The repair operation is an operation in a narrow portion between the stub tubes, between the control rod drive mechanism housings, and between the control rod drive housing and the in-core monitor housing. The repair operation in a narrow portion in the boiling water nuclear power plant using a repair apparatus for the welded portions is described in Japanese Patent No. 4178027 (WO2002/011151).

Even in a pressurized water nuclear power plant, a plurality of in-core guide tubes pass through a bottom head of a reactor pressure vessel and each in-core guide tube is attached to the bottom head by welding. The in-core guide tubes correspond to the in-core monitor housings in the boiling water nuclear power plant. Japanese Patent Laid-open No. 2011-52966 (US2011/0051878A1) describes the repair operation in a narrow portion of the in-core guide tubes using the repair apparatus for the welded portion between the bottom head of the reactor pressure vessel and the in-core guide tube, which is performed in the pressurized water nuclear power plant.

CITATION LIST

Patent Literature

[Patent Literature 1] Japanese Patent Laid-open No. 2010-276491

[Patent Literature 2] Japanese Patent No. 3469185

[Patent Literature 3] Japanese Patent Laid-open No. 2004-255410

[Patent Literature 4] Japanese Patent Laid-open No. 2006-95559

[Patent Literature 5] Japanese Patent Laid-open No. 2007-216235

[Patent Literature 6] Japanese Patent Laid-open No. 2007-50446

[Patent Literature 7] Japanese Patent Application Publication No. 9(1997)-506039

[Patent Literature 8] Japanese Patent No. 4178027

[Patent Literature 9] Japanese Patent Laid-open No. 2011-52966

Non Patent Literature

[Non Patent literature 1] Itaru Chida et al., Study on Laser Welding Technology of Nuclear Power Plants, Japan Machinery Society Essays (Edition B), Volume 78, No. 787, (2012-3), pp. 73-77

SUMMARY OF THE INVENTION

Technical Problem

The laser welding can concentrate high-density energy in a very narrow range, so that it can obtain deeper melting than the arc welding and can reduce the heat input quantity. Further, the laser welding uses a high-energy density heat source, so that it can realize high-speed welding. As a result, the laser welding can realize highly-efficient, highly-reliable, and high-quality welding.

The repair operation for the welded portion of the reactor internal in the reactor pressure vessel is performed in a high-radiation environment, so that the laser welding, which is capable of obtaining a welded portion whose welding time is short and whose reliability is high, is welding suitable for the repair operation of the welded portion in the reactor pressure vessel. The laser welding using a wire needs to feed a wire to the welding portion melted by the laser. To repair the welded portion of the bottom head of the reactor pressure vessel, the wire is fed from the wire feed mechanism installed on the laser welding head transferred to the bottom head, though loadable wires are limited in the number. Therefore, when the wires loaded on the laser welding head are used up, it is necessary to complement wires to the wire feed mechanism of the laser welding head pulled up and taken out from the reactor pressure vessel and then move the laser welding head down to the neighborhood of the welding portion in the reactor pressure vessel again.

In contrast, in the laser welding for feeding a powder-shape metal, which is a filler metal, to the welding portion (hereinafter, for convenience, referred to as powder laser welding) and this laser welding described in Japanese Patent Laid-open No. 2007-50446 and Japanese Patent Application Publication No. 9(1997)-506039, the metallic powder which is the filler metal can be fed continuously to the powder laser welding head through a tube in a state that a laser welding head including a powder feed path is disposed in the neighborhood of the welding portion in the reactor pressure vessel. Therefore, in the laser welding using powder, there is no need to move up and down the powder laser welding head so as to complement wires which are a filler metal, and the time required for the welding operation can be shortened compared with the laser welding using a wire.

However, as mentioned above, the powder laser welding head includes a collimate lens and a condensing lens, so that the powder laser welding head becomes longer in length. Thus, the repair welding for the respective welded portions of the control rod drive mechanism housings, the stub tubes, and the in-core monitor housings which are standing together in large numbers on the bottom head of the reactor pressure vessel is difficult. For example, when repairing the welded portion between the control rod drive mechanism housings and the stub tubes and between the stub tubes and the bottom head of the reactor pressure vessel, the powder laser welding head needs to move around overall the peripheries of the control rod drive mechanism housings. However, since the respective intervals between other control rod drive mechanism housings and other stub tubes adjacent to the control rod drive mechanism housings and the stub tubes which are welding object are a narrow portion, it is difficult to make the laser welding head, which is long in length, move around the peripheries of the control rod drive mechanism housings and the stub tubes which are the welding objects facing the narrow portions.

An object of the present invention is to provide a laser welding apparatus, a preventive maintenance method for a reactor internal structure of a nuclear power plant, and a laser cutting apparatus capable of easily performing a prevention maintenance operation for a prevention maintenance object of a plant which faces a narrow portion and shortening the time required for the prevention maintenance operation.

Solution to Problem

A feature of the present invention for attaining the aforementioned object are a structure having a welding head including a head body, and a collimate lens installed on the head body and facing an end face of an optical fiber connected to the head body; and a welding head scanning apparatus of scanning the welding head, wherein a laser path of introducing a laser emitted from the optical fiber and passing through the collimate lens is formed in the head body;

wherein the welding head includes only the collimate lens as a lens; and wherein a laser outlet of the laser path is formed in an end portion of the head body.

The welding head includes only the collimate lens as a lens but includes no condensing lens, so that length of the welding head can be shortened and the welding head is made compact. Therefore, when the welding head moves in a narrow portion, the welding head can be avoided from interference to a structural member other than the welding object. As consequence, the laser welding to the welding object by the welding head can be performed easily, and the time required for the welding operation can be shortened. Namely, the laser welding which is a prevention maintenance operation to the welding object which is a prevention maintenance object can be performed easily and the time required for the prevention maintenance operation can be shortened.

Preferably, it is desired to form the powder feed path of introducing the metallic powder which is a filler metal in the head body and form an injection outlet of the powder feed path in the end portion of the head body. The welding head forming the powder feed path is made compact. Therefore, when the welding head moves in a narrow portion, the welding head can be further avoided from interference to a structural member other than the welding object, and the laser welding using powder to the welding object by the welding head can be performed easily, and the time required for the welding operation can be further shortened. Namely, the laser welding which is a prevention maintenance operation using powder to the welding object which is a prevention maintenance object can be performed easily and the time required for the prevention maintenance operation can be further shortened.

The aforementioned object can be attained also by a structure having a cutting head including a head body, and a collimate lens installed on the head body and facing an end face of an optical fiber connected to the head body; and a cutting head scanning apparatus of scanning the working head, wherein a laser path of introducing a laser emitted from the optical fiber and passing through the collimate lens and a gas feed path are formed in the head body;

wherein the cutting head includes only the collimate lens as a lens; and wherein a laser outlet of the laser path and a gas outlet of the gas feed path are formed in an end portion of the head body.

The cutting head includes only the collimate lens as a lens but includes no condensing lens, so that length of the cutting head can be shortened in length and the cutting head is made compact. Therefore, when the cutting head moves in a narrow portion, the cutting head can be avoided from interference to a structural member other than the welding object. As consequence, the cutting operation to the cutting object by the cutting head can be performed easily, and the time required for the cutting operation can be shortened. Namely, the laser cutting operation which is a prevention maintenance operation to the cutting object which is a prevention maintenance object can be performed easily and the time required for the prevention maintenance operation can be shortened.

Advantageous Effects of Invention

According to the present invention, the prevention maintenance operation for the prevention maintenance object of the nuclear power plant which faces a narrow portion can be performed easily and the time required for the prevention maintenance operation can be shortened.

DETAILED DESCRIPTION OF THE PREFERRED EMBODIMENTS

The inventors reviewed a countermeasure of shortening the length of a laser welding head to enable welding for a welding object facing a narrow portion.

Before reviewing the countermeasure, the inventors conducted a welding test in order to confirm the validity of the powder laser welding applied to maintenance welding of a reactor internal in a reactor pressure vessel. An example of the welding test will be explained by referring to FIG. 7. As described in Japanese Patent No. 4178027, many control rod drive mechanism housings, stub tubes, and in-core monitor housings are attached to a bottom head of a reactor pressure vessel of a boiling water nuclear power plant, that is, a bottom of the reactor pressure vessel by welding. The stub tube positioned on an outermost periphery which is attached to the bottom is at an angle of approximately 45° relative to the bottom of the reactor pressure vessel. Further, many in-core guide tubes are attached by welding on a bottom of a reactor pressure vessel of a pressurized water nuclear power plant as described in Japanese Patent Laid-open No. 2011-52966. The in-core guide tube positioned on an outermost periphery is also at an angle of approximately 45° relative to the bottom of the reactor pressure vessel. As mentioned above, in the boiling water nuclear power plant and the pressurized water nuclear power plant, when the attaching angle of a tubular structure (for example, a stub tube, a control rod drive mechanism housing, an in-core monitor housing, or an in-core guide tube) which is an reactor internal attached to the bottom of the reactor pressure vessel by welding becomes less than or equal to 50° and the laser welding head is fixed in one direction, if the welding object can be welded at an angle of 0° (perpendicular) to 60° between the surface which is the welding object and the laser welding head, the welding of the tubular structure attached to the bottom of the reactor pressure vessel can be covered.

Figure 7:
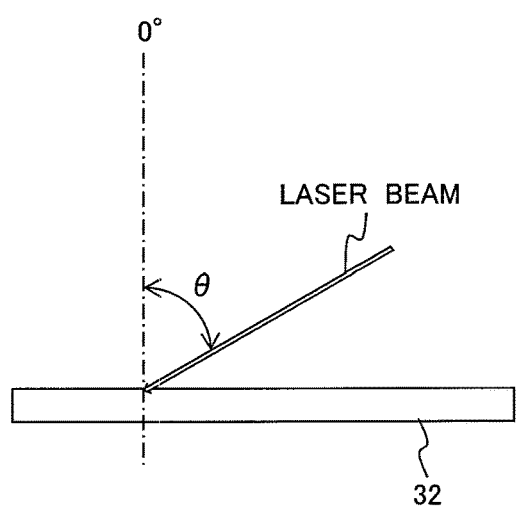
FIG. 7 is an explanatory drawing showing a test state of the powder laser welding.

The outline of the welding test that was conducted to check the weldability of the powder laser welding for an inclined surface of a welding test material is shown in FIG. 7. In the welding test, the weldability was checked within the angle range from 0° (perpendicular) to 60° relative to a plane of the welding test material. The welding test material is made from low alloy steel or an Inconel material used for the bottom of the reactor pressure vessel and an Inconel material was used for the metallic powder which is a filler metal. For the welding test conditions, laser power P was set within a range from 300 W to 4000 W, and a laser spot diameter D was set within a range from 1.4 mm to 5.4 mm, and the welding speed was set within the range from 9 cm/min to 300 cm/min, and a metallic powder feed rate M was set within a range from 0 g/min to 63 g/min.

The welding test was conducted both for the laser welding under the non-filler condition of feeding no metallic powder and for the laser welding of feeding metallic powder. The results obtained by these welding tests will be explained below by referring to FIGS. 8 to 11.

Figure 8:
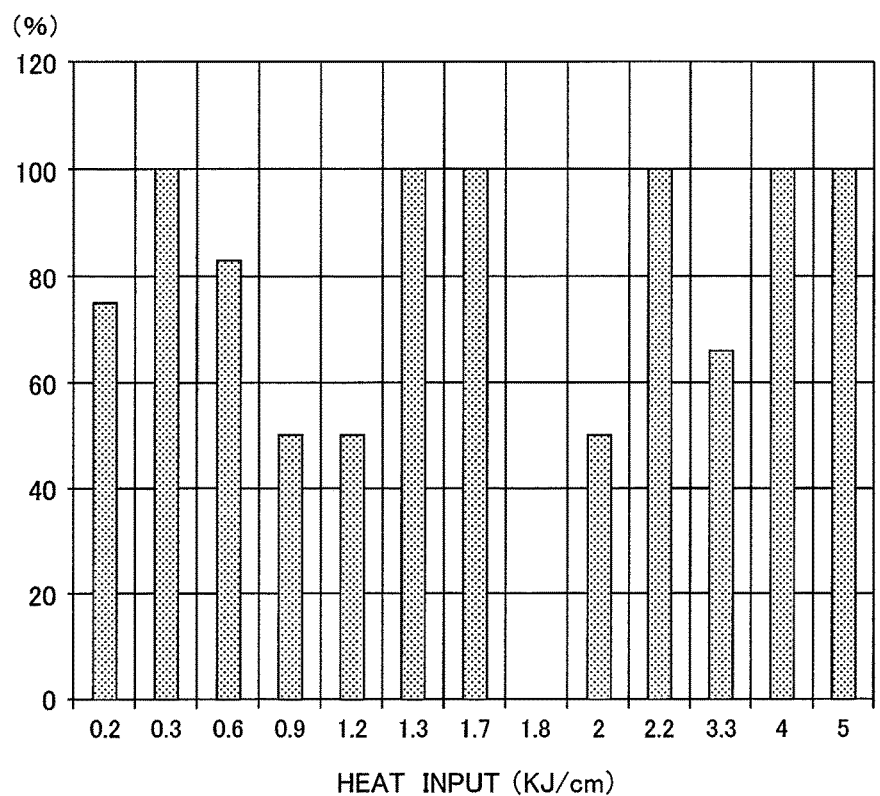
FIG. 8 is an explanatory drawing showing test results of the laser welding performed under non-filler condition which are arranged by heat input.
Figure 9:
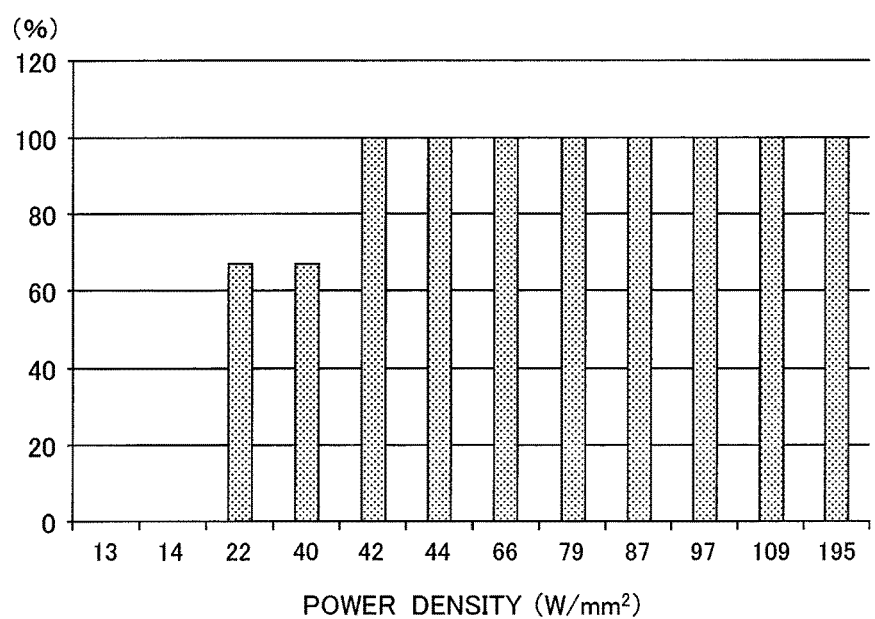
FIG. 9 is an explanatory drawing showing test results of laser welding performed under non-filler condition which are arranged by power density.
Figure 10:
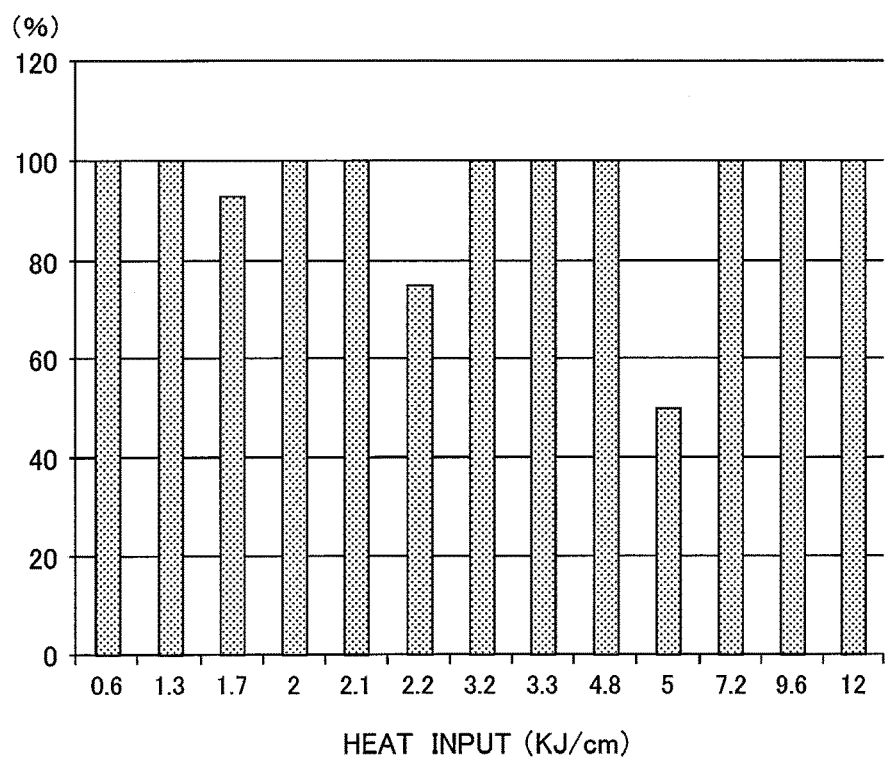
FIG. 10 is an explanatory drawing showing test results of powder laser welding which are arranged by heat input.
Figure 11:
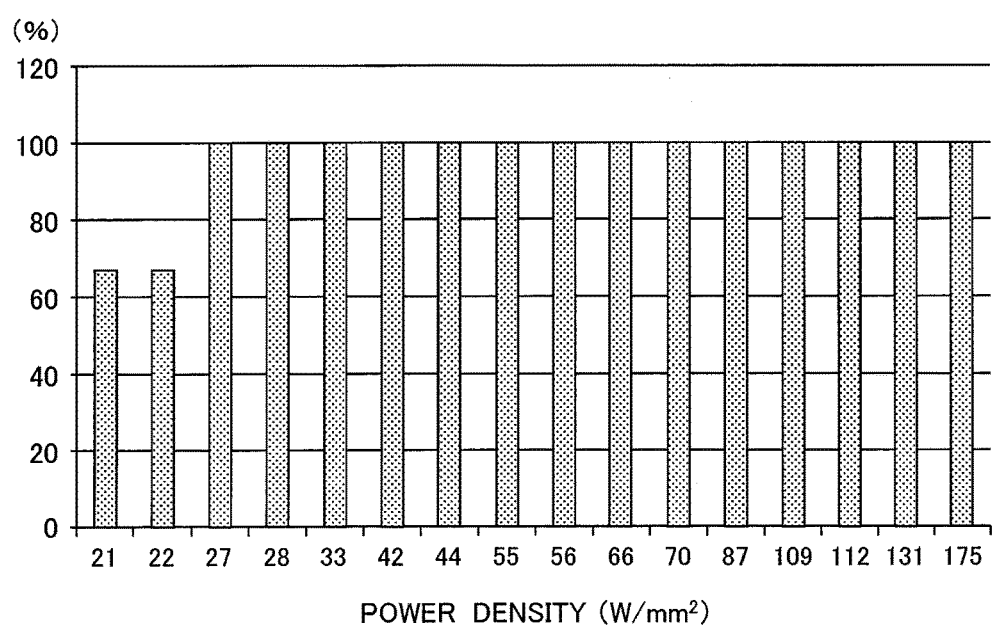
FIG. 11 is an explanatory drawing showing test results of powder laser welding which are arranged by power density.

The results obtained by the laser welding test under the non-filler condition of feeding no metallic powder are shown in FIGS. 8 and 9 and the results obtained by the laser welding test of feeding metallic powder are shown in FIGS. 10 and 11. In the welding tests, the longitudinal section of each welding surface was observed. In the laser welding under the non-filler condition, when the longitudinal section of each welding test material was melted, it was decided as passing and when the longitudinal section was not melted, it was decided as failure. In the welding test results, the rate of the number of passed welding test materials to the total number of welding test materials was summarized as a pass rate (%). Also in the test results when the metallic powder is fed, similarly, the longitudinal section of each welded surface was observed. When satisfactory penetration was obtained, it was decided as passing, and when lack of fusion was observed, it was decided as failure, and then the results were summarized by a pass rate.

The results obtained by the laser welding test under the non-filler condition and the results of the laser welding test for feeding the metallic powder, were arranged based on the heat input (kJ/cm) described in Itaru Chida et al., Study on Laser Welding Technology of Nuclear Power Plants, Japan Machinery Society Essays (Edition B), Volume 78, No. 787, (2012-3), pp. 73-77 and based on the power density (W/mm$^2$) obtained by the research results on the laser welding technology of the nuclear power plant by the inventors, respectively. The test results of the laser welding performed under the non-filler condition which are arranged by the heat input are shown in FIG. 8 and the test results of the laser welding performed under the non-filler condition which are arranged by the power density are shown in FIG. 9. In addition, the test results of the powder laser welding arranged by the heat input are shown in FIG. 10 and the test results of the powder laser welding arranged by the power density are shown in FIG. 11.

In the test results of the laser welding performed under the non-filler condition which are arranged by the heat input (refer to FIG. 8), the pass rate of the welding to the heat input (kJ/cm) at the time of welding is varied. For example, the pass rate is 100% at 0.3 kJ/cm which is low heat input, and the pass rate shows such a low value as 0% at 1.8 kJ/cm which is high heat input. As mentioned above, when the test results of the laser welding performed under the non-filler condition are arranged by the heat input, a fixed tendency cannot be found between the heat input and the pass rate. On the other hand, when the test results of the laser welding performed under the non-filler condition are arranged by the power density (W/mm$^2$) at the time of welding (refer to FIG. 9), if the power density is set to 42 W/mm$^2$ or higher, it is found that the welding pass rate can be maintained at 100%.

Even in the test results of the laser welding for feeding metallic powder to the welding place, the similar tendency to the laser welding performed under the non-filler condition is seen. When arranged by the heat input of the welding, the welding pass rate is varied (refer to FIG. 10) and when arranged by the power density at the time of welding, if the power density is set to 27 W/mm$^2$ or higher, it is found that the welding pass rate can be maintained at 100% (refer to FIG. 11).

According to the aforementioned test results, when the laser power is set within the range from 300 W to 4000 W, the laser spot diameter is set within the range from 1.4 mm to 5.4 mm, and the welding speed is set within the range from 9 cm/min to 300 cm/min, and when the metallic powder feed rate is set within the range from 0 g/min to 63 g/min, if the power density is adjusted to 42 W/mm$^2$ or higher, that is, to laser power P satisfying $P>10.5\ \pi D^2$, both of the non-filler laser welding and the laser welding for feeding metallic powder can perform good laser welding at a pass rate of 100% within the angle range between the central axis of the laser welding head and the welding surface from 0° to ±60°. Here, D indicates a spot diameter of the laser.

In addition, the feed rate of the metallic powder which is a filler metal to the fusion zone of the welding portion is conventionally shown by [g/min] which is a metallic powder feed rate M (g) fed per unit time (min). When the above-mentioned test results of the powder laser welding are arranged based on the conventional arranging method, that is, the arranging method by [g/min] which is a metallic powder quantity M per unit time, the feed rate of the metallic powder to the fusion zone of the welding portion is shown by 1.63 g/min to 63.3 g/min. However, when the feed rate of the metallic powder to the fusion zone of the welding portion is arranged by the relation (g/kW·s) of the laser beam power P (kW), the irradiation time t (s), and the metallic powder feed rate M (g), the feed rate of the metallic powder in the powder laser welding test of this time can be arranged within a limited range from 0.1 g/kW·s to 0.26 g/kW·s. The inventors found that if the feed rate M of the metallic powder is adjusted to 0.26 g/kW·s or lower, that is, to the condition satisfying [M<0.26×P×t] based on the test results of the powder laser welding executed at this time, build-up welding can be performed.

The laser welding using metallic powder (hereinafter, as mentioned earlier, for convenience, referred to as the powder laser welding) was performed and then the appearance of the welding test materials was checked. As a result, non-welded metallic powder was found adhered on a bead surface of the welding portion and a rough feel was confirmed, so that the bead surface with non-welded metallic powder adhered to was subjected again to the melting process with non-filler using the laser from the laser welding head (hereinafter, for convenience, referred to as the powder laser welding head) including a powder feed path. After the melting process, the bead surface was checked by penetrant inspection, thus no defects were observed.

By the aforementioned welding test results, it became clear that in the powder laser welding, the angle between the central axis of the powder laser welding head and the welding surface can be set within the range of ±60° with the perpendicular line of the welding surface; and the angle adjustment of the powder laser welding head with a tubular structure such as the stub tube and the in-core monitor housing (or the in-core guide tube) which are positioned in a narrow portion inside the bottom of the reactor pressure vessel can be performed far more easily than the angle adjustment of the laser welding head for making the angle relative to the welding surface as close to perpendicular as possible in the conventional wire feed laser welding. Further, it became clear that the operation time required for the powder laser welding can be shortened extensively by adjusting the laser power P so as to satisfy $P > 10.5 \ \pi D^2$ and further adjusting the feed rate M of the metallic powder so as to satisfy $M < 0.26 \times P \times t$ as knowledge by the aforementioned powder laser welding test.

Next, the interference of the powder laser welding head to a tubular structure, that is a tubular member (for example, a stub tube, a control rod drive mechanism housing, or an in-core monitor housing) was investigated in the case of applying the powder laser welding to the welding portion of the tubular structure. The inventors investigated the interference thereof by assuming that the welding can be performed when the angle between the powder laser welding head and the welding surface is within the range of ±60° as a result of reflecting the aforementioned test results of the powder laser welding.

The conventional powder laser welding head includes a collimate lens and a condensing lens similarly to the laser welding head described in Japanese Patent Laid-open No. 2004-255410 and Japanese Patent Laid-open No. 2006-95559. The total length of the conventional powder laser welding head is 760 mm, for example, in the powder laser welding head for outputting a 4000 W laser beam.

As described in Japanese Patent No. 4178027, for example, it is assumed to repair the welded portion between one stub tube attached to the inner surface of the bottom of the reactor pressure vessel of the boiling water nuclear power plant and the bottom by using the powder laser welding head with a total length of 760 mm. To repair the welded portion between the stub tube and the bottom of the reactor pressure vessel, the powder laser welding head is disposed in the reactor pressure vessel so that the angle of the welding surface of the welding portion relative to the central axis of the powder laser welding head falls within the range of ±60°, and furthermore, the powder laser welding head needs to be rotated over the entire periphery of the welding portion. However, when intending the conventional powder laser welding head with a total length of 760 mm to rotate around the stub tube to be welded, the rotating powder laser welding head interferes with another stub tube adjacent to the stub tube that is a welding object and the control rod drive mechanism housing attached to the stub tube. Thus, the powder laser welding head cannot rotate around the stub tube that is the welding object, and repairing of the welded portion being a repair object becomes difficult.

To avoid interference with the adjacent stub tube that occurs when rotating the powder laser welding head, it is effective to shorten the length of the powder laser welding head. Therefore, the inventors investigated shortening the length of the powder laser welding head.

Figure 12:
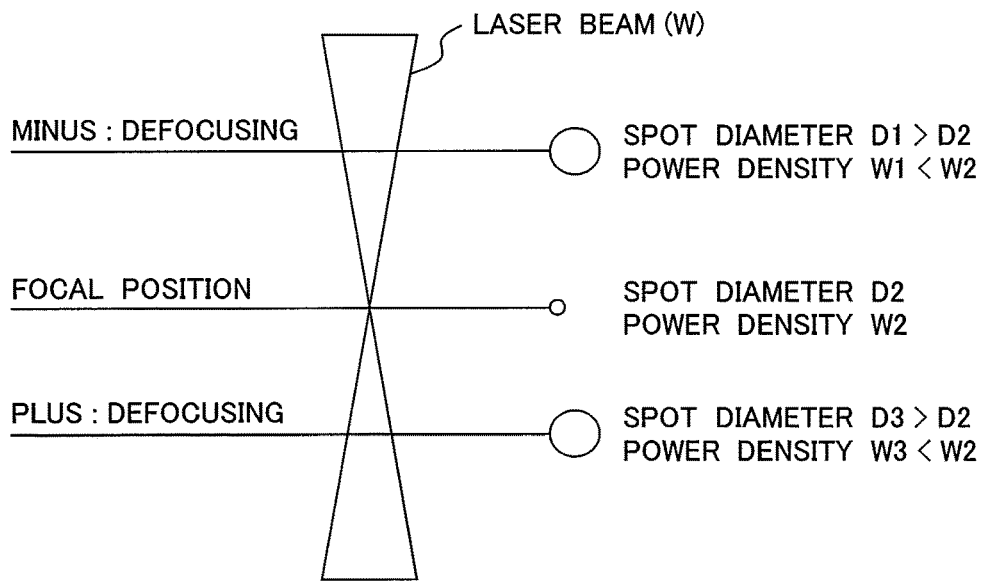
FIG. 12 is an explanatory drawing showing a laser beam spread state in a conventional powder laser welding head including a collimate lens and condensing lens.

As described in Japanese Patent Laid-open No. 2004-255410 and Japanese Patent Laid-open No. 2006-95559, the laser welding head used by the conventional laser welding includes a collimate lens and a condensing lens. The laser beam spread state in the laser welding head having an optical system including the collimate lens and condensing lens is shown schematically in FIG. 12. The laser emitted from the optical fiber and converted to a parallel beam by the collimate lens passes through the condensing lens and then is converged on a focal position of the condensing lens. When welding by using the laser passing through the condensing lens like the conventional laser welding head, if coming off the focal position of the condensing lens, the laser diameter at either of the position closer to the condensing lens side than to the focal position and the position on the welding member side from the focal position becomes larger than the laser diameter at the focal position and the laser power density ($W/mm^2$) at either of the former position and the latter position becomes smaller than the laser power density at the focal position. Therefore, in the laser welding of the wire feed system, the distance between the condensing lens and the welding surface needs to be adjusted so as to fit to the focal distance of the condensing lens.

In contrast, in the powder laser welding, if the metallic powder fed to the fusion zone of the melding surface generated by the laser irradiation is melted, the welding member can be welded. Therefore, the inventors considered that even when the powder laser welding head including the condensing lens is used, the welding using the metallic powder is possible without fitting the distance between the condensing lens and the welding surface strictly to the focal distance of the condensing lens. Therefore, the inventors performed the powder laser welding test by the powder laser welding head having a focal lens using metallic powder with a particle diameter of 63 to 212 μm and they find that powder laser welding obtaining a pass rate of 100% is possible so long as the power density is 27 $W/mm^2$ or higher even if the distance between the focal lens and the welding surface is off the focal distance of the focal lens.

The inventors performed the powder laser welding on the welding surface, for example, under the conditions of using a powder laser welding head including the condensing lens, shifting and setting the distance between the condensing lens and the welding surface within a range from −6 mm to 30 mm for the focal distance of the condensing lens, inclining the central axis of the powder laser welding head at 50° to the welding surface, and setting the power density at 112 $W/mm^2$. The inventors checked the welded surface after end of the powder laser welding and, as mentioned above, they were successful in melting the metallic powder on the welding surface even though the distance between the condensing lens and the welded surface was shifted from the focal distance of the condensing lens within the range from −6 mm to 30 mm.

On the basis of the results, the inventors confirmed that the metallic powder fed to the welding surface can be melted and powder laser welding at a pass rate of 100% is possible even when the condensing lens is deleted and only the collimate lens is used as a lens of the optical system of the powder laser welding head. The condensing lens is deleted, thus the length of the powder laser welding head can be shortened. Namely, the total length of the powder laser welding head with the condensing lens deleted can be shortened to the extent that, when rotating the powder laser welding head around the welding portion of one stub tube, the head does not interfere with the adjacent stub tube, control rod drive mechanism housing, or in-core monitor housing. The powder laser welding head using only the collimate lens as a lens can easily rotate around the welding portion of one stub tube.

Figure 13:
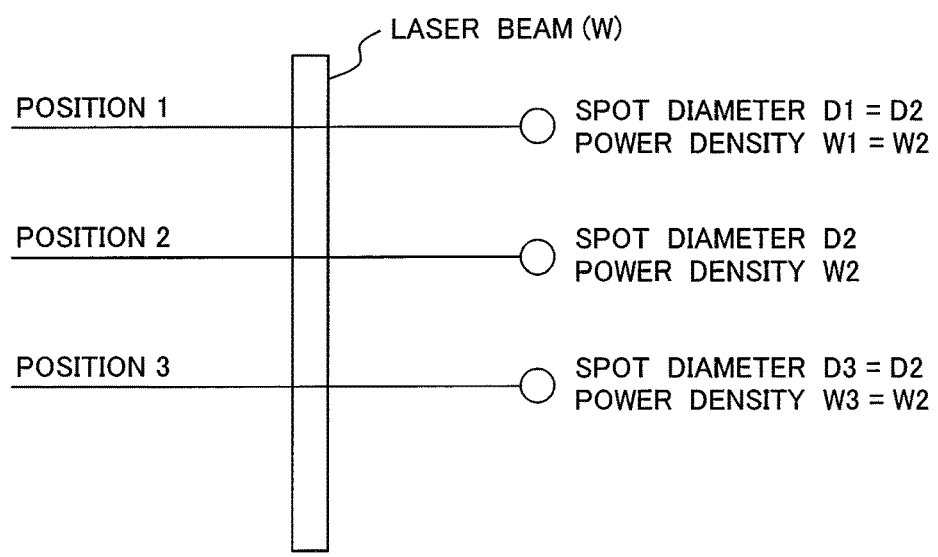
FIG. 13 is an explanatory drawing showing a laser beam spread state in a powder laser welding head including only a collimate lens as a lens.

The laser beam spread state in the powder laser welding head using only the collimate lens as a lens is shown schematically in FIG. 13. In the powder laser welding head, the laser spot diameter passing through the collimate lens is almost constant and does not change until reaching the welding surface.

The welding using the laser has been described so far. Meanwhile, the inventors found that the optical system used for the powder laser welding head for using only the collimate lens as a lens can be applied to a laser cutting apparatus used for laser cutting work.

The inventors executed the laser cutting work test by changing the power density in the same way as the powder laser welding, that is, under the conditions of power densities of 42 kW/mm$^2$ and 56 kW/mm$^2$. The laser power density used for cutting needs to be larger than the laser power density used for the aforementioned laser welding. At 42 kW/mm$^2$, stainless steel with a sheet thickness of 0.5 mm can be cut at a cutting speed of 1100 mm/s or lower and at 56 kW/mm$^2$, it can be cut at a cutting speed of 1300 mm/s or lower. When the obtained results are arranged by power density (W/mm$^2$)/cutting speed (mm/s$^2$) based on the above test results, the structure member can be cut by the laser at the time of 43 W·s/mm or higher. Therefore, when the power density of the parallel laser beam generated by passing through the collimate lens is set to 42 kW/mm$^2$ or higher, it is desirable to set the cutting work condition by the laser to 43 W·s/mm or higher. This numerical value indicates the product of the irradiation laser power and the irradiation time per unit volume of a cutting work object.

The embodiments of the present invention reflecting the above investigation results will be explained below.

Embodiment 1

Figure 1:
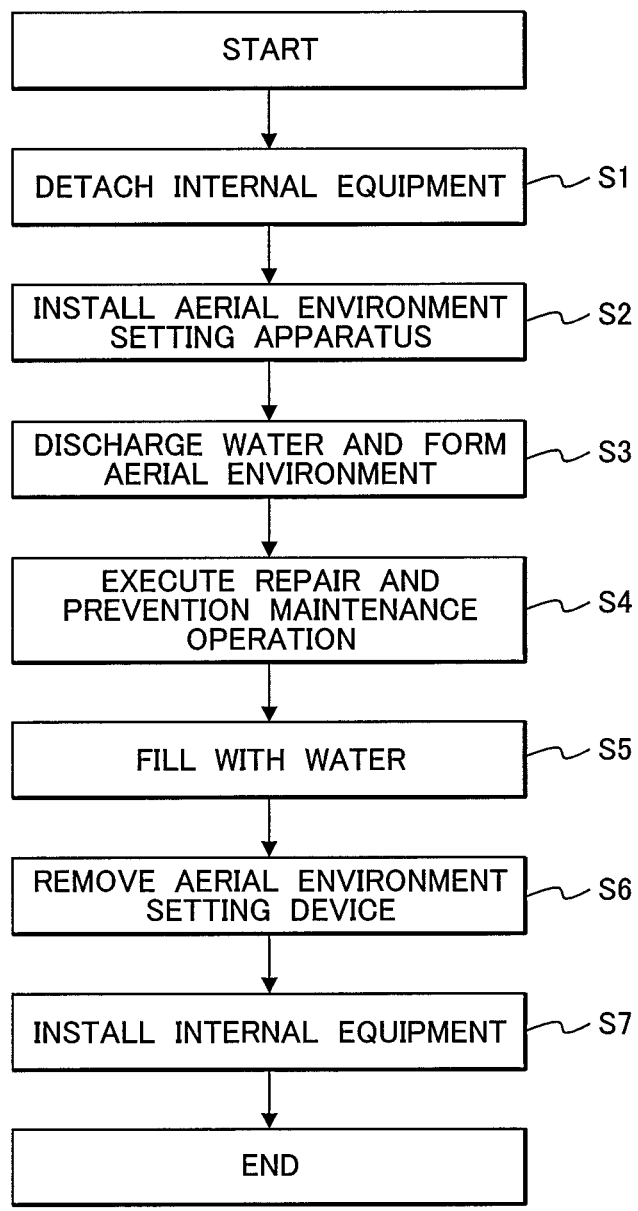
FIG. 1 is a flow chart showing procedure of a prevention maintenance method of a reactor internal of a nuclear power plant which is applied to the boiling water nuclear power plant according to embodiment 1 which is a preferred embodiment of the present invention.
Figure 2:
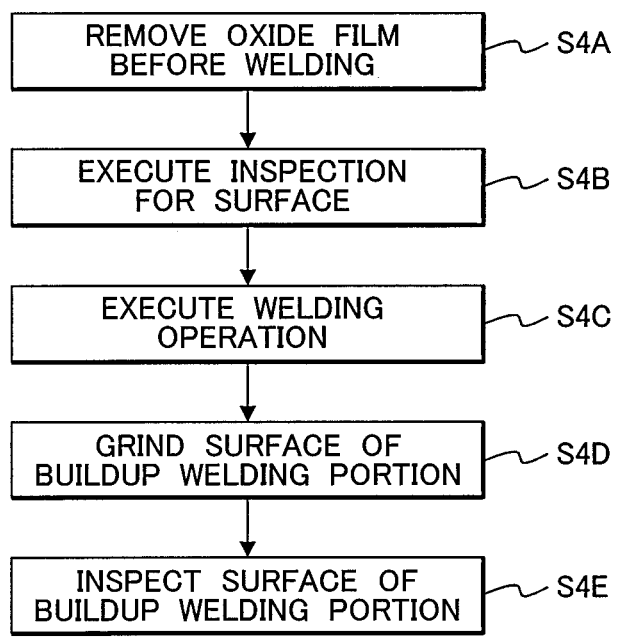
FIG. 2 is a flow chart showing a detailed procedure of step S4 shown in FIG. 1.

A prevention maintenance method of a reactor internal of a nuclear power plant according to embodiment 1 which is a preferred embodiment of the present invention will be explained below by referring to FIGS. 1 and 2. The prevention maintenance method of the reactor internal of the present embodiment is applied to a reactor internal existing in a reactor pressure vessel of a boiling water nuclear power plant.

Figure 3:
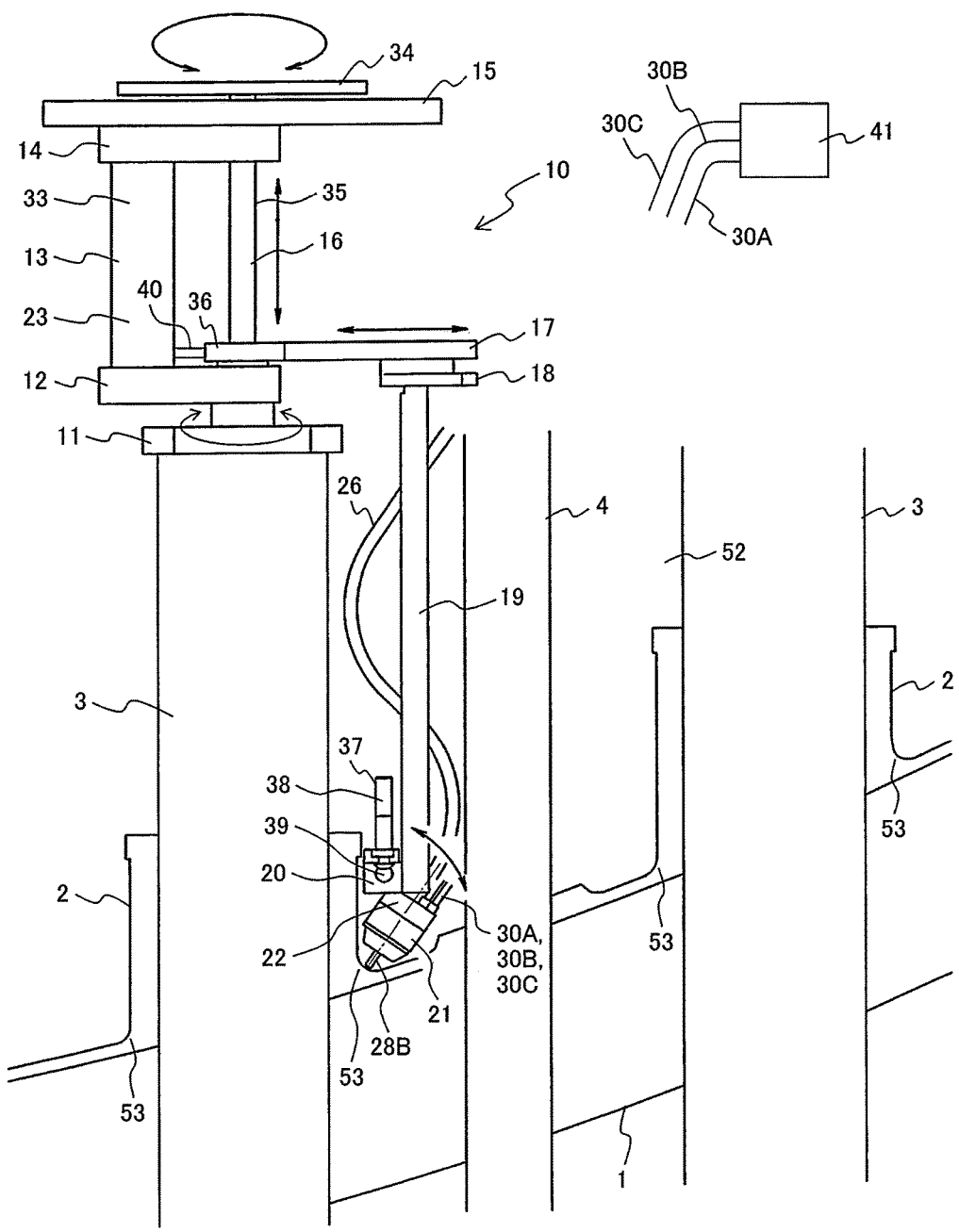
FIG. 3 is a detailed structural diagram showing a status of a powder laser welding apparatus attached to a control rod drive mechanism housing to repair a welded portion between a stub tube and a bottom head of a reactor pressure vessel in repair operation and prevention maintenance operation shown in FIG. 2.

In the prevention maintenance method of the reactor internal of the nuclear power plant of the present embodiment, a laser welding apparatus 10 shown in FIG. 3 is used. The laser welding apparatus 10 is provided with a powder laser welding head (welding head) 21, a welding head scanning apparatus 23, and a metallic powder feed apparatus 41. The powder laser welding head 21 includes a head body 22 and a lens housing 24 as shown in FIG. 3. The lens housing 24 connected to one end portion of optical fiber 26 is disposed in a head body 28 and a collimate lens 25 is installed in the lens housing 24 so as to face one end of the optical fiber 26. A laser path 27 which is an opening portion formed from the lens housing 24 toward one end of the head body 22 is formed in the head body 22. The laser path 27 has openings at its both ends. The first opening of the laser path 27 is opposite to the collimate lens 25. The second opening of the laser path 27 is a laser outlet and is formed in an end face of the head body 28. The lens housing 24 and the laser path 27 are arranged along the central axis of the head body 22. Another end portion of the optical fiber 26 is connected to a laser oscillator (not shown). The powder laser welding head 21 includes only the collimate lens 25 as a lens but includes no condensing lens.

Figure 4:
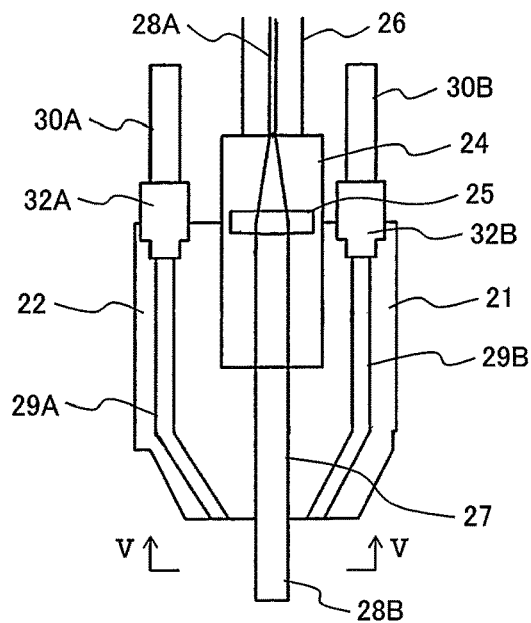
FIG. 4 is a detailed structural diagram showing a powder laser welding head shown in FIG. 3.
Figure 5:
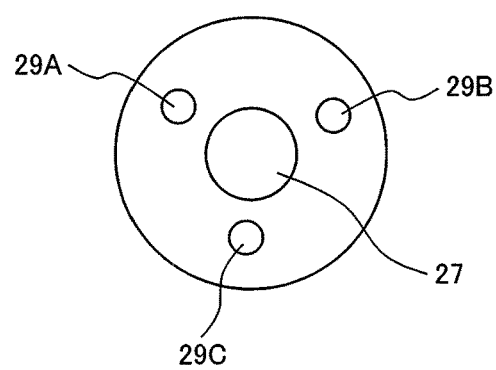
FIG. 5 is a front view showing a powder laser welding head viewing from an arrow direction of V-V line shown in FIG. 4.

Three powder feed paths 29A, 29B, and 29C (refer to FIG. 5) are formed in the head body 22. FIG. 4 does not show the powder feed path 29C. Each of the powder feed paths 29A, 29B, and 29C is inclined toward an extended line of a central axis of the laser path 27 at the end portion of the head body 22, the end portion including the laser outlet. The respective powder injection outlets of the powder feed paths 29A, 29B, and 29C are formed in the end face of the head body 22 with the laser outlet of the laser path 27 formed. The distance between the center of the powder injection outlet of the powder feed path 29B and the center of the laser outlet is the same as the distance between the center of the powder injection outlet of the powder feed path 29A and the center of the laser outlet. A powder feed hose 30A is attached to the head body 22 by a fixing member 32A and the powder feed hose 30A is connected with the powder feed path 29A. A powder feed hose 30B is attached to the head body 22 by a fixing member 32B and the powder feed hose 30B is connected with the powder feed path 29B. A powder feed hose 30C is attached to the head body 22 by a fixing member (not shown) (refer to FIG. 3) and the powder feed hose 30C is connected with the powder feed path 29C. The respective other end portions of the powder feed hoses 30A, 30B, and 30C are connected to the metallic powder feed apparatus 41 (refer to FIG. 3).

As shown in FIG. 3, the welding head scanning apparatus 23 includes a seating member 11, a support body 13, a rotator 16, a horizontal direction moving apparatus 18, a hoisting table 36, and a swing drive apparatus 37. A support body 13 is rotatably attached to the seating member 11. The support body 13 includes a lower support plate 12, an upper support plate 14, a pedestal 15, and a support member 33. The support member 33 is attached to the top of the lower support plate 12 rotatably attached to the seating member 11 and the upper support plate 14 is attached to an upper end of the support member 33. The pedestal 15 is attached to a top face of the upper support plate 14. A first motor (not shown) is fixed to an undersurface of the seating member 11 and a rotary shaft of the first motor is connected to the lower support plate 12 from the underneath. The first motor is a rotary apparatus of the support body 13.

The rotator 16 includes a rotation plate 34 and the rotary shaft 35. The rotary shaft 35, on a surface of which a trapezoidal screw of a male screw is formed, passes through the upper support plate 14 and the pedestal 15 and an upper end portion of the rotary shaft 35 is rotatably attached to the pedestal 15. A lower end portion of the rotary shaft 35 is rotatably attached to the lower support plate 12. The rotation plate 34 is disposed above the pedestal 15 and is attached to the upper end portion of the rotary shaft 35. A second motor (not shown) configuring a rotation drive apparatus of the rotator 16 is installed on the top face of the pedestal 15. A rotary shaft of the second motor is connected to a worm (not shown) and the worm meshes with the rotation plate 34 which is a worm wheel.

The hoisting table 36 forms a through-hole (not shown) through which the rotary shaft 35 passes and the trapezoidal screw of a female screw meshing with the trapezoidal screw of the rotary shaft 35 is formed on an inner surface of the through-hole (not shown). The rotary shaft 35 passes through the through-hole of the hoisting table 36 and the trapezoidal screw of the rotary shaft 35 meshes with the trapezoidal screw of the through-hole. A end portion of a rotation prevention member 40 installed on the hoisting table 36 is inserted into the groove (not shown) formed on the surface of the support member 33 opposite to the rotary shaft 35 and extending in an axial direction of the rotary shaft 35 so that the hoisting table 36 does not rotate in correspondence with the rotation of the rotary shaft 35. The groove is formed between the lower end of the support member 33 and the upper end thereof. By use of such a structure, the hoisting table 36 moves in the axial direction of the rotary shaft 35. The hoisting table 36 moves up and down along the rotary shaft 35 by driving of the second motor.

The horizontal direction drive apparatus 18 is movably attached to an arm 17 attached to the hoisting table 36 and extending horizontally. A rod-shaped support member 19 is attached to the horizontal direction drive apparatus 18 and extends toward the underneath. A head holding member 20 is attached to a lower end portion of the support member 19. A rotary shaft 39 that is attached to the head body 22 of the powder laser welding head 21 is rotatably attached to the head holding member 20. The rotary shaft 39 extends horizontally.

The swing drive apparatus 37 is installed on the head holding member 20. The swing drive apparatus 37 includes a third motor 38 and a rotary power transfer mechanism (not shown) including a reduction mechanism for transferring the rotary power of the third motor 38 to the rotary shaft 39. The third motor 38 is attached to the head holding member 20.

The prevention maintenance method of the reactor internal of the nuclear power plant of the present embodiment will be explained below. The prevention maintenance method of the reactor internal of the nuclear power plant of the present embodiment is executed after the operation of the boiling water nuclear power plant is shut down. The prevention maintenance method will be explained based on the procedure (including each process of the steps S1 to S7) shown in FIG. 1 by referring to FIGS. 2 and 3 of Japanese Patent No. 4178027. In the boiling water nuclear power plant, as shown in FIG. 3, a plurality of control rod drive mechanism housings 3 and a plurality of in-core monitor housings 4 pass through the bottom (bottom head) of a reactor pressure vessel 1 and are attached to the bottom. Each control rod drive mechanism housing 3 is separately inserted into a plurality of stub tubes 2 attached to the inner surface of the bottom of the reactor pressure vessel 1 by welding, passes through the stub tubes 2 and the bottom of the reactor pressure vessel 1, and is attached to the stub tubes 2 by welding. Further, each in-core monitor housing 4 also passes through the bottom of the reactor pressure vessel 1 and is attached to the bottom by welding. In the prevention maintenance method of the present embodiment, to reduce the stress corrosion cracking of the respective welding portions 53 of each stub tube 2 and the bottom of the reactor pressure vessel 1, the excellent corrosion resistant build-up welding is executed on the surfaces of the welded portions.

The internal equipment is detached and is transferred from the reactor pressure vessel (step S1). After the operation of the boiling water nuclear power plant is shut down, an upper cover of a reactor primary containment vessel surrounding the reactor pressure vessel 1 is detached and furthermore, an upper cover of the reactor pressure vessel 1 is removed. The respective detached upper covers of the reactor primary containment vessel and the reactor pressure vessel 1 are hanged by the ceiling crane of the reactor building surrounding the reactor primary containment vessel, are transferred to the operation floor positioned above the reactor primary containment vessel in the reactor building, and are kept on the operation floor. A reactor well formed above the reactor primary containment vessel in the reactor building, and the reactor pressure vessel 1 are internally filled with cooling water. Thereafter, the steam dryer and the steam separator installed in the reactor pressure vessel 1 are removed from the reactor pressure vessel 1 and are transferred outside the reactor pressure vessel 1 by the ceiling crane, and are kept in a dryer separator pool in the reactor building. The fuel assembly loaded in the core in the reactor pressure vessel 1 is also taken out by a fuel exchange apparatus moving on the operation floor and is transferred to and is kept in a fuel storage pool in the reactor building. The control rods are pulled up by the fuel exchange apparatus outside the reactor pressure vessel 1 and are transferred to and are kept in the fuel storage pool. A plurality of fuel supports placed on a core support plate installed in the reactor pressure vessel 1 and supporting the lower end portion of the fuel assembly are taken out from the reactor pressure vessel 1. Furthermore, a plurality of control rod guide tubes arranged below the core support plate in the reactor pressure vessel is taken out upward the core support plate through the opening formed in the core support plate to insert the fuel support and is transferred outside the reactor pressure vessel 1. The fuel supports and control rod guide tubes, for example, are hanged by the ceiling crane and are transferred upward.

The aerial environment setting apparatus is installed (step S2). After all the fuel assemblies loaded in the core are transferred to the fuel storage pool, the aerial environment setting apparatus (not shown) is hanged by the ceiling crane and is attached on the flange attached to an upper end portion of the reactor pressure vessel 1 and attached to the flange in the state that the reactor well is filled with cooling water. A radiation shielding cover is used as an aerial environment setting apparatus. The radiation shielding cover is removably attached to the flange attached to the upper end portion of the reactor pressure vessel 1 and covers the reactor pressure vessel 1 as described in shown in FIG. 3 of Japanese Patent No. 4178027. The radiation shielding cover is not rotated. The radiation shielding cover is shown as a radiation shielding member 21c in Japanese Patent No. 4178027. In the present embodiment, the radiation shielding cover is removably attached to the flange in the cooling water though in Japanese Patent No. 4178027, radiation shielding member 21c is attached to a flange 1b of a reactor pressure vessel (RPV) 1 in a state that water level is lowered below a position of the RPV flange 1b. The radiation shielding cover shields a radiation discharged upward from the reactor pressure vessel 1. The radiation shielding cover used in the present embodiment, for example, is a radiation shielding cover with a plurality of openings formed to insert the guide pipes shown in FIG. 4A of Japanese Patent No. 4178027. Each opening formed in the radiation shielding cover positions right above each control rod drive mechanism housing 3 attached to the bottom of the reactor pressure vessel 1. Each opening formed in the radiation shielding cover is closed by a closing plug made of the radiation shielding material. When the radiation shielding cover is attached on the flange of the upper end portion of the reactor pressure vessel 1, each opening formed in the radiation shielding cover is positioned right above each stub tube 2. As a radiation shielding cover used in the present embodiment, the radiation shielding cover described in either of FIG. 4B and FIG. 4C of Japanese Patent No. 4178027 may be used.

The insertion of the guide pipe into the reactor pressure vessel is performed as described below. In the state that the reactor pressure vessel is filled with cooling water, the closing plug existing at position into which the guide pipe is inserted, concretely, right above the stub tubes 2 subjected to build-up welding of the repair and the prevention maintenance, the closing plug closing each opening formed in the radiation shielding cover, is detached and taken out from the reactor pressure vessel and the guide pipe is inserted into the opening. The guide pipe is divided into a plurality of portions in the axial direction and the guide pipe inserted into the aforementioned opening descends toward the bottom of the reactor pressure vessel 1 by adding (refer to Japanese Patent No. 4178027). The descent of the guide pipe is stopped when the lower end of the guide pipe reaches a predetermined position below the core support plate installed in the reactor pressure vessel 1. When a lower end of the guide pipe is arrived at the predetermined position in the axial direction of the reactor pressure vessel 1, the upper end of the guide pipe is removably attached on the top face of the radiation shielding cover.

To effectively perform the repair and the prevention maintenance operation, the guide pipe may be inserted from each of the plurality of openings formed in the radiation shielding cover. By doing this, the build-up welding of the welding portion of each of the stub tubes 2 which will be described later can be performed in a plurality of places in parallel.

The water in the reactor pressure vessel is discharged and an aerial environment is formed in the reactor pressure vessel (step S3). The open/close valve installed in a drain pipe (not shown) connected to the bottom head of the reactor pressure vessel is opened and the cooling water in the reactor well and the reactor pressure vessel is discharged outside the reactor pressure vessel through the drain pipe. According to the discharge of cooling water, a water surface of the cooling water in the reactor well lowers and the water surface soon lowers below the first radiation shielding cover in the reactor pressure vessel. When the cooling water in the reactor pressure vessel is all discharged, the aerial environment is formed in the reactor pressure vessel.

The repair and the prevention maintenance operation are executed (step S4). The repair and the prevention maintenance operation of step 4 include each process of steps S4A to S4E which are shown in FIG. 2. The repair and the prevention maintenance operation will be explained in detail by referring to FIG. 2.

The oxide film in the zone where the repair and the prevention maintenance operation are executed is removed (step S4A). When the boiling water nuclear power plant is in operation, an oxide film including a radioactive nuclide is formed on each surface of the respective welding portions 53 between each stub tube 2 and the bottom of the reactor pressure vessel 1. Therefore, the oxide film is removed before the build-up welding is performed on each surface of the welding portions 53. The oxide film is removed, thus the radioactive nuclide is also removed, and in the build-up welding performed for prevention maintenance, the radioactive nuclide can be avoided from imprisoning into the build-up welding. The decontamination operation of removing the oxide film is performed by the grinding apparatus described in Japanese Patent Laid-open No. 2011-52966 or the chemical decontamination described in Japanese Patent No. 4178027. The decontamination by the grinding apparatus is preferably applied when performing the repair and the prevention maintenance in a specific welding portion and the decontamination by the chemical decontamination is preferably applied when performing the repair and the prevention maintenance within a wide range. In the present embodiment, the respective welding portions 53 between all the stub tubes 2 attached to the bottom of the reactor pressure vessel 1 and the bottom of the reactor pressure vessel 1 are an object of prevention maintenance and in order to decontaminate the entire inner surface of the bottom of the reactor pressure vessel 1, the chemical decontamination is applied.

A chemical decontamination liquid is fed to the zone below the core support plate in the reactor pressure vessel 1 from the drain pipe (not shown) connected to the bottom of the reactor pressure vessel 1. The feed of the chemical decontamination liquid is performed until the respective welding portions 53 are all immersed in the chemical decontamination liquid. As chemical decontamination, oxide decontamination and reduction decontamination are performed. Therefore, the oxide decontamination liquid (for example, a potassium permanganate aqueous solution) and the reduction decontamination liquid (for example, an oxalic acid aqueous solution) which are a chemical decontamination liquid are fed in sequence. Firstly, the oxide decontamination liquid is fed from the drain pipe to a lower plenum 52 in the reactor pressure vessel 1 and the oxide decontamination for each welded portion aforementioned is performed. In the boiling water nuclear power plant, the lower plenum 52 is a region formed below the core, to be more specific, the core support plate in the reactor pressure vessel 1. After completion of the oxide decontamination, the oxide decontamination liquid in the reactor pressure vessel 1 is discharged from the drain pipe and is processed. Thereafter, the reduction decontamination liquid is fed from the drain pipe to the lower plenum 52 and the reduction decontamination for each oxide-decontaminated welded portion is executed. After completion of the reduction decontamination, the reduction decontamination liquid is discharged from the lower plenum 52 in the reactor pressure vessel 1 into the drain pipe and is processed.

The inspection for a surface of the repair and prevention maintenance object zone before welding is executed (step S4B). For example, a penetrant test apparatus is hanged by the ceiling crane and descends to the lower plenum 52 in the reactor pressure vessel 1 through the guide pipe held by the radiation shielding cover. Using the penetrant test apparatus, the inspection for the surface of the welding portion 53 between the stub tube 2 and the bottom of the reactor pressure vessel 1 is executed. This stub tube 2 positions right under the guide pipe. By the penetrant inspection using the penetrant inspection apparatus, when a crack is found in the welded portion, in the corresponding welded portion, the repair operation for the crack is performed and thereafter, for the surface of the corresponding welded portion, the build-up welding which is the prevention maintenance operation needs to be performed. When no crack is found in the welded portion, the build-up welding is performed. After end of the surface inspection, the penetrant test apparatus is pulled up through the guide pipe.

When a crack is found in the welded portion, the working apparatus for removing the cracking portion of the welded portion descends to the position of the welded portion via the guide pipe. Using the working apparatus, the cracking portion of the welded portion is cut off and the crack is removed. The cutting scrap generated by cutting is sucked by the sucking device (not shown) and is discharged out from the reactor pressure vessel 1.

The welding operation is executed (Step S4C). In the respective welding of repair and prevention maintenance, the powder laser welding apparatus 10 shown in FIG. 3 is used. The powder laser welding apparatus 10 is hanged down by the ceiling crane and descends in the guide pipe up to the upper end position of the control rod drive mechanism housing 3 attached to the stub tube 2 positioned in the corresponding welding portion 53. The seating member 11 of the powder laser welding apparatus 10 is seated at the upper end of the control rod drive mechanism housing 3, and the projection (not shown) installed on the under surface of the seating member 11 and the aforementioned first motor are inserted into the control rod drive mechanism housing 3. In this way, the powder laser welding apparatus 10 is positioned and the powder laser welding apparatus 10 is prevented from tumble by the projection inserted into the control rod drive mechanism housing 3.

Here, the build-up welding (prevention maintenance welding) when no crack is found in the welding portion 53 between the stub tube 2 positioned right under the guide pipe and the bottom of the reactor pressure vessel 1 will be explained.

When the powder laser welding apparatus 10 is seated at the upper end of the control rod drive mechanism housing 3, the powder laser welding head 21 and the support member 19 are arranged between the control rod drive mechanism housing 3 where the powder laser welding apparatus 10 is seated and another control rod drive mechanism housing 3 adjacent to the former control rod drive mechanism housing 3. The third motor 38 of the swing drive apparatus 37 is driven to rotate the rotary shaft 39 and the powder laser welding head 21 is rotated in the axial direction of the control rod drive mechanism housing 3 until the central axis of the powder laser welding head 21 is inclined, for example, at 50° relative to the surface of the welding portion 53 subjected to the build-up welding. When the central axis of the powder laser welding head 21 is inclined at 50° relative to the surface of the welding portion 53, the driving of the third motor 38 is stopped. The horizontal direction drive apparatus 18 is moved along the arm 17 and the distance in the horizontal direction between the welding portion 53 and the laser outlet of the powder laser welding head 21 is adjusted. When the distance becomes a first predetermined distance, the movement of the horizontal direction moving apparatus 18 is stopped. Next, the distance in the axial direction of the control rod drive mechanism housing 3 between the welding portion 53 and the laser outlet thereof is adjusted to a second predetermined distance. The adjustment of the distance in the axial direction of the control rod drive mechanism housing 3 is performed by rotating the rotary shaft 35 by driving the second motor and moving the hoisting table 36 meshing with the trapezoidal screw of the rotary shaft 35 in the axial direction of the control rod drive mechanism housing 3. When the distance in the axial direction of the control rod drive mechanism housing 3 between the welding portion 53 between the stub tube 2 and the bottom of the reactor pressure vessel 1 and the laser outlet of the powder laser welding head 21 becomes the second predetermined distance, the second motor is stopped. The laser outlet of the powder laser welding head 21 is opposite to the surface of the welding portion 53.

The optical fiber 26 and the powder feed hoses 30A, 30B, and 30C which are connected to the head body 22 of the powder laser welding head 21 pass through the guide pipe and reach above the reactor pressure vessel 1. The laser oscillator connected to the optical fiber 26 and the metallic powder feed apparatus 41 connected to the powder feed hoses 30A, 30B, and 30C are installed on the operation floor in the reactor building.

The laser oscillator is operated and for example, a laser 28A of power of 1 kW generated by the laser oscillator satisfying $P>10.5\ \pi D^2$ enters the optical fiber 26. The laser 28A passes through the optical fiber 26 and is transmitted to the end of the optical fiber 26 on the side of a lens housing 24 (refer to FIG. 4). In the lens housing 24, the laser 28A emitted from the end of the optical fiber 26 spreads and enters the collimate lens 25. The laser 28A has a power density of 44 W/mm$^2$ and becomes a laser 28B of a parallel beam by the collimate lens 25 (refer to FIG. 4) and enters the laser path 27 formed in the head body 22. The laser 28B with a spot diameter D of 5.4 mm of the parallel beam passing through the laser path 27 is emitted from the laser outlet formed in the head body 22 and is irradiated on the surface, for which the build-up welding is performed, of the welding portion 53 between the stub tube 2 and the bottom of the reactor pressure vessel 1. By the irradiation of the laser 28B, the surface of the welding portion 53 is melted.

On the other hand, the metallic powder (for example, powder of the excellent corrosion resistant Inconel 52 alloy capable of suppressing the stress corrosion cracking) which is a filler metal fed from the metallic powder feed apparatus 41 is introduced to the powder feed paths 29A, 29B, and 29C which are formed in the head body 22 through the powder feed hoses 30A, 30B, and 30C, respectively. The total amount of the metallic powder fed to the powder feed paths 29A, 29B, and 29C, that is, the metallic powder feed quantity M is, for example, 0.17 g/W·s satisfying $M<0.26\times P\times t$. The metallic powder is jetted from the respective powder injection outlets of the powder feed paths 29A, 29B, and 29C toward the fusion zones of the welding portion 53 mentioned above.

Here, the adjustment of the aforementioned laser power 1 kW for satisfying $P>10.5\ \pi D^2$ and the aforementioned metallic powder feed amount M 0.17 g/W·s for satisfying $M<0.26\times P\times t$ will be explained. The diameter D of the laser 28B varies with the distance from the exit of the optical fibers 26 to the collimate lens 25, so that the relation between the diameter D and the distance is obtained beforehand and when producing the powder laser welding head 21, the collimate lens 25 is disposed at the position where the diameter D of the laser 28B becomes the target diameter $D_0$, this is, 5.4 mm. In the powder laser welding apparatus 10, the powder laser welding head 21 produced in this way is used. The laser power P is adjusted by the laser oscillator. Concretely, the laser power P is adjusted, for example, to 1 kW by the laser oscillator so as to obtain the target power density 42 W/mm$^2$ or higher, for example, 44 W/mm$^2$ on the basis of the diameter 5.4 mm of the laser 28B. The metallic powder feed amount M is adjusted, for example, to 0.17 g/W·s by the metallic powder feed apparatus 41.

The metallic powder discharged from the powder injection outlet and reaching the fusion zone is heated and melted by the laser 28B emitted from the laser outlet of the powder laser welding head 21. The powder laser welding head 21 is permitted to rotate around the welding portion 53 to be subjected to the build-up welding while emitting the laser from the laser outlet of the laser path 27 and discharging the metallic powder from the respective powder injection outlets of the powder feed paths 29A, 29B, and 29C.

The rotation of the powder laser welding head 21 is performed by driving the first motor fixed to the under surface of the seating member 11. The lower support plate 12, that is, the support body 13 rotates by driving the first motor and the rotator 16 rotates. By these rotations, the hoisting table 36 meshing with the rotary shaft 35 rotates and the arm 17 attached to the hoisting table 36 rotates around the central axis of the control rod drive mechanism housing 3 in the horizontal surface. Therefore, the powder laser welding head 21 rotates around the concerned stub tube 2. The inner surface of the bottom of the reactor pressure vessel 1 is a curved surface, so that the position of the welding portion 53 in the axial direction of the reactor pressure vessel 1 is different depending on a peripheral direction of the welding portion 53. Namely, the position of the welding portion 53 in the axial direction of the reactor pressure vessel 1 is low on the central axis side of the reactor pressure vessel 1 and high on the side wall side of the reactor pressure vessel 1. In consideration of such a position difference of the welding portion 53 in the axial direction of the reactor pressure vessel 1, in order to keep the distance of in the axial direction the control rod drive mechanism housing 3 between the welding portion 53 and the laser outlet of the laser path 27 at the second predetermined distance, the second motor is driven to move up and down the hoisting table 36 while rotating the powder laser welding head 21 around the concerned stub tube 2.

According to the above, over the entire periphery in the peripheral direction of the welding portion 53 between the stub tube 2 and the bottom of the reactor pressure vessel 1, the excellent corrosion resistant build-up welding portion, that is, the excellent corrosion resistant welding overlay for suppressing the stress corrosion cracking can be formed on the surface of the welding portion 53.

The monitoring camera (not shown) is attached to the under surface of the head holding member 20. After completion of the build-up welding, the arm 17 is rotated by driving the first motor in the state that the emission of the laser 28A to the optical fiber 26 and the feed of metallic powder to the powder feed paths 29A, 29B, and 29C are stopped. Therefore, the powder laser welding head 21 and the monitoring camera rotate around the stub tube 2 subjected to the build-up welding. The monitoring camera rotates while taking photographs of the surface of the buildup welding portion. The image information of the surface of the buildup welding portion photographed by the monitoring camera is transmitted to a display apparatus (not shown) connected to the monitoring camera and disposed on the operation floor through the cable for transmitting the image information. The transmitted image information is displayed on the display apparatus. An operator on the operation floor looks at the image displayed on the display apparatus and monitors the state of the surface of the build-up welding portion.

When adhesion of non-welded metallic powder which is a filler metal to the surface of the build-up welding portion is observed based on the displayed image, the laser 28B converted to the parallel beam by the collimate lens 25 is irradiated to the surface of the build-up welding portion formed on the surface of the welding portion 53 in a state that the laser 28A generated by the laser oscillator is permitted to enter the optical fibers 26 and the feed of metallic powder to the powder feed paths 29A, 29B, and 29C is stopped (in the non-filler state). The non-welded metallic powder adhered on the surface of the build-up welding portion is melted by the irradiation of the laser 28B. The support body 13 and the rotator 16 are rotated by driving the first motor and the powder laser welding head 21 is rotated around the stub tube 2 subjected to the build-up welding on the welding portion 53 while by emitting the laser 28B in the non-filler state. Therefore, the non-welded metallic powder adhered on the surface of the build-up welding portion can be melted over the entire periphery of the build-up welding portion. When the adhesion of the non-welded metallic powder on the surface of the build-up welding portion is not observed based on the image displayed on the display apparatus, the emission of the laser 28 on the surface of the build-up welding portion in the aforementioned non-filler state is not performed.

After completion of the aforementioned build-up welding, the powder laser welding apparatus 10 is pulled up by using the ceiling crane through the guide pipe, is taken out from the reactor pressure vessel 1, and is come up to the operation floor.

When a crack is found in the welding portion 53 at step S4B, as mentioned above, the cracking portion of the welding portion 53 is removed by cutting by the working apparatus. Thereafter, the repair welding is performed for the crack-removed portion of the welding portion 53 at step S4C. In the repair welding, the powder laser welding apparatus 10 transferred via the guide pipe is used. In the repair welding, the metallic powder is jetted from the respective powder injection outlet of the powder feed paths 29A, 29B, and 29C while irradiating the laser 28B emitted from the laser outlet of the powder laser welding head 21 to the crack-removed portion of the welding portion 53, and the repair welding for the crack-removed portion is performed. After completion of the repair welding, the build-up welding for the surface of the welding portion 53 is executed as aforementioned.

When the crack generated in the welding portion 53 is small, using the powder laser welding head 21 of the powder laser welding apparatus 10, the crack is repaired by the non-filler laser welding.

Figure 6:
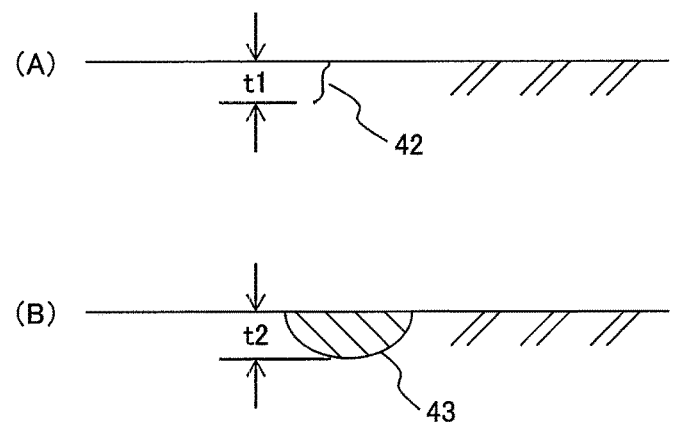
FIG. 6 is an explanatory drawing showing repair by non-filler laser welding.

In step S4B, the inspection for the surface of the welding portion 53 may be executed by an ultrasonic test apparatus instead of the penetrant test apparatus. It is assumed that a crack 42 of a depth of t1 shown in (A) shown in FIG. 6 is found in the welding portion 53 by the ultrasonic test in which the ultrasonic test apparatus is used. As mentioned above, the laser outlet of the laser path 27 formed in the head body 22 is permitted to face the crack 42 by driving the first motor, second motor, and third motor and the distance in the horizontal direction between the welding portion 53 and the laser outlet of the powder laser welding head 21 is adjusted to the first predetermined distance. Furthermore, the distance in the axial direction of the control rod drive mechanism housing 3 between the welding portion 53 and the laser outlet of the powder laser welding head 21 is adjusted to the second predetermined distance.

The laser oscillator is operated and the laser 28A with power of 1 kW enters the optical fiber 26. The laser 28B converted to a parallel beam by the collimate lens 25 in the head body 22 is irradiated toward the portion of the welding portion 53 where the crack 42 exists from the laser discharge opening of the laser path 27. The power density of the irradiated laser 28B is, for example, 44 W/mm$^2$. At this time, the feed of metallic power from the metallic powder feed apparatus 41 to the powder feed hoses 30A, 30B, and 30C is stopped. The portion of the welding portion 53 where the crack 42 exists is melted by the irradiation of the laser 28B. The position of the laser outlet of the laser path 27 is changed by driving each of the first motor, second motor, and third motor and the welding portion around the crack 42 is melted. A melting portion 43 with no crack 42 formed by the melting is formed on the welding portion 53.

When the depth of the crack 42 is t1, and the power density of the laser 28B is 42 W/mm$^2$ or higher, and a melting depth t2 of the welding portion 53 for performing the melting process of the crack 42 satisfies t2>t1, the repair of the crack 42 generated in the welding portion 53 is enabled by the laser 28B (refer to (B) shown in FIG. 6). Therefore, the non-filler laser 28B can be applied to the repair operation of the crack.

When the repair by the non-filler laser welding for removing the crack 42 to the welding portion 53 is finished, the laser oscillator is stopped and the irradiation of the laser 28B is stopped. Soon, the melting portion 43 solidifies in the state that the crack 42 is repaired.

A surface of the build-up welding portion is ground (step S4D). The grinder hanged by the ceiling crane descends through the guide pipe and reaches the neighborhood of the welding portion 53 between the stub tube 2 and the bottom of the reactor pressure vessel 1. Using the grinder, the surface of the build-up welding portion formed on the welding portion 53 is ground. The grinding is executed over the entire periphery in the peripheral direction of the build-up welding portion. After completion of grinding of the surface of the build-up welding portion, the grinder is pulled up in the guide pipe and transferred to the operation floor.

When the repair by the aforementioned non-filler laser welding is performed, after completion of this repair, the surface of the welding portion 53 including the solidified melting portion 43 between the stub tube 2 and the bottom of the reactor pressure vessel 1 is also ground by the grinder.

The surface inspection of the build-up welding portion after build-up welding is executed (step S4E). Similarly to the step S4B, the penetrant inspection apparatus is hanged by the ceiling crane and descends to the lower plenum 52 of the reactor pressure vessel 1 through the guide pipe held by the radiation shielding cover. Using the penetrant inspection apparatus, the surface inspection of the build-up welding portion whose surface has been ground is executed. After completion of the surface inspection of the build-up welding portion, the penetrant inspection apparatus is hanged by the ceiling crane and is transferred to the operation floor through the guide pipe.

According to the above, the build-up welding for the surface of one welding portion 53 between the stub tube 2 and the bottom of the reactor pressure vessel 1 or the build-up welding executed in parallel for the surfaces of a plurality of welding portions 53 between the stub tubes 2 and the bottom of the reactor pressure vessel 1 finishes. Thereafter, each operation at the steps S4A to S4E is executed for the welding portion 53 between another stub tube 2 existing on the bottom of the reactor pressure vessel 1 and the bottom thereof. As mentioned above, each operation at the steps S4A to S4E is repeated, thus the repair and prevention maintenance operation for each welding portion 53 between all the stub tubes 2 existing on the bottom of the reactor pressure vessel 1 and the bottoms thereof, that is, the repair and prevention maintenance operation in step S4 finish.

The reactor pressure vessel is filled with water (step S5). The penetrant inspection apparatus is transferred to the operation floor and after the operation at step S4 finishes, cooling water is fed to the reactor pressure vessel 1. After cooling water is fed up to a predetermined water level, the feed of cooling water into the reactor pressure vessel 1 is stopped.

The aerial environment setting apparatus is removed (step S6). The guide pipe inserted into the opening of the radiation shielding cover installed on the flange at the upper end of the reactor pressure vessel 1 is hanged by the ceiling crane, is pulled up, and is removed from the radiation shielding cover. After the guide pipe is removed, the opening of the radiation shielding cover is closed by the closing plug. After completion of removal of the guide pipe, the radiation shielding cover on the flange of the reactor pressure vessel 1 is hanged up by the ceiling crane and is collected on the operation floor.

The internal equipment is installed (step S7). The internal equipment removed at step S1 is installed in the reactor pressure vessel 1. The control rod guide pipes and fuel supports are hanged in order by the ceiling crane and are transferred into the reactor pressure vessel 1. These are installed at predetermined positions in the reactor pressure vessel 1. After all the fuel supports are installed, the control rods are transferred into the reactor pressure vessel by the fuel exchange apparatus and are disposed in each control rod guide pipe through the through-hole formed in the fuel support. The fuel assemblies are loaded in the core in the reactor pressure vessel 1 from the fuel storage pool by the fuel exchange apparatus. The steam separator and the steam dryer are hanged in order by the ceiling crane, are transferred into the reactor pressure vessel 1, and are installed in a predetermined position in the reactor pressure vessel 1. Thereafter, the upper cover of the reactor pressure vessel 1 is attached to the flange of the reactor pressure vessel 1 and the upper cover of the primary containment vessel is installed at the upper end of the primary containment vessel.

According to the above, all the processes of the prevention maintenance method of the reactor internal of the nuclear power plant according to the present embodiment finish.

The powder laser welding apparatus 10 including the powder laser welding head 21 can be applied to the repair and the prevention maintenance operation for the welding portion between the stub tube 2 and the control rod drive mechanism 3 and each aforementioned process of the steps S1 to S7 can be executed. Particularly, each aforementioned process of the steps S4A to S4E can be executed and the repair welding for the welding portion between the stub tube 2 and the control rod drive mechanism 3, and the build-up welding to the surface of the concerned welding portion can be executed.

According to the present embodiment, the powder laser welding head 21 of the powder laser welding apparatus 10 includes only the collimate lens 25 as a lens but includes no condensing lens, so that the length of the powder laser welding head 21 is approximately 70 mm, which is about 1/10 of the length of the conventional powder laser welding head (760 mm). In this way, the powder laser welding head 21 can be shortened in length and is made compact.

In the present embodiment, the powder laser welding head 21 shortened in length is used, so that when performing the repair welding and the build-up welding of prevention maintenance for the welding portion 53 between the stub tube 2 and the bottom of the reactor pressure vessel 1 or another welding portion between the stub tubes 2 and the control rod drive mechanism housings 3 in the lower plenum 52 of the reactor pressure vessel 1 where many stub tubes 2, control rod drive mechanism housings 3, and in-core monitor housings 4 stand together to form a narrow portion, the interference with another stub tube 2, control rod drive mechanism housing 3, and in-core monitor housing 4 adjoining the stub tube 2 of a welding object and forming a narrow portion between the stub tubes 2 of a welding object can be avoided and the powder laser welding head 21 can be rotated around the stub tube 2 of the welding object. Thus, the powder laser welding can be performed easily for the welding portion of the stub tube 2 facing the narrow portion 53 and the time required for the build-up welding operation by the powder laser welding head 21 can be shortened. In the present embodiment, the welding is performed by the laser irradiation, so that the high-speed welding is enabled, thus the welding operation time can be shortened. Namely, the laser welding which is a prevention maintenance object using powder for the welding portion 53 of the stub tube 2 of a welding object which is a prevention maintenance object can be performed easily and the time required for the prevention maintenance operation can be shortened.

Further, in the present embodiment, since the powder laser welding head 21 of the powder laser welding apparatus 10 includes only the collimate lens 25 as a lens, the laser 28B generated by the collimate lens 25 is irradiated to the welding object, so that there is no need to fit the welding place of the welding object to the focal position of the condensing lens like the conventional laser welding head using the condensing lens and even when the distance between the powder laser welding head 21 and the welding place of the welding object varies with the movement of the powder laser welding head 21, good powder welding (powder laser welding obtaining a pass rate of 100%) can be performed for the welding place of the welding object.

According to the present embodiment, metallic powder (for example, powder of an Inconel 52 alloy) more excellent in the corrosion resistance than the reactor internal (for example, the stub tube 2 and the control rod drive mechanism housing) is built up on the surface of the welding portion (for example, the welding portion 53), so that the stress corrosion cracking in the welding portion of the reactor internal can be suppressed.

In the present embodiment, the power P of the laser 28B to be irradiated to the welding portion is 1 kW satisfying $P > 10.5 \, \pi D^2$ and furthermore, the metallic powder feed amount M is 0.17 g/W·s satisfying $M < 2.6 \times P \times t$, so that good build-up welding portion using metallic powder with a pass rate of 100% can be obtained.

In the present embodiment, when non-welded metallic powder is adhered on the surface of the build-up welding portion generated by the feed of metallic powder and the irradiation of the laser 28B, the laser 28B is irradiated on the surface of the build-up welding portion and the adhered non-welded metallic powder is melted in the state (non-filler state) that no metallic powder is fed, so that the surface of the build-up welding portion can be improved from the rough surface with non-welded metallic powder adhered to a smoother surface. As a result, the surface of the build-up welding portion is made smooth by the irradiation of the laser 28B in the non-filler state, so that there is no need to perform the grinding operation to the rough surface of the build-up welding portion with non-welded metallic powder adhered thereto for the purpose of inspection after the build-up welding. Since the grinding operation requiring a long time becomes unnecessary, the inspection of the build-up welding portion can be started that much sooner. Therefore, the time requiring the prevention maintenance operation by the build-up welding can be shortened.

The lower plenum 52 in the reactor pressure vessel 1, in which the welding portion 53 and the like, which an object of the repair welding and the prevention maintenance build-up welding in the reactor pressure vessel 1, exists, is set in the aerial environment, so that the powder laser welding to the concerned welding portion can be performed easily. When performing the powder laser welding in water, the metallic powder which is a filler metal jetted from the powder feed paths 29A and 29B and the like cannot be fed to the welding place of the welding portion 53 and the like due to the resistance of water and the build-up welding to the welding portion 53 and the like cannot be performed satisfactorily. When performing the powder laser welding in the aerial environment, such a problem does not arise.

Embodiment 2

The prevention maintenance method of the reactor internal of the nuclear power plant according to embodiment 2 which is another suitable embodiment of the present invention will be explained below. The prevention maintenance method of the reactor internal of the present embodiment is applied to reactor internal existing in a reactor pressure vessel of a pressurized water nuclear power plant. In the present embodiment, the reactor internal which is a prevention maintenance object is a bottom mounted instrumentation nozzle which is a tubular structure, and more specifically, a tubular member and the prevention maintenance is executed for the welding portion between the bottom mounted instrumentation nozzle (corresponds to the in-core monitor housing 4 in the boiling water nuclear power plant) and the bottom of the reactor pressure vessel 1.

Figure 14:
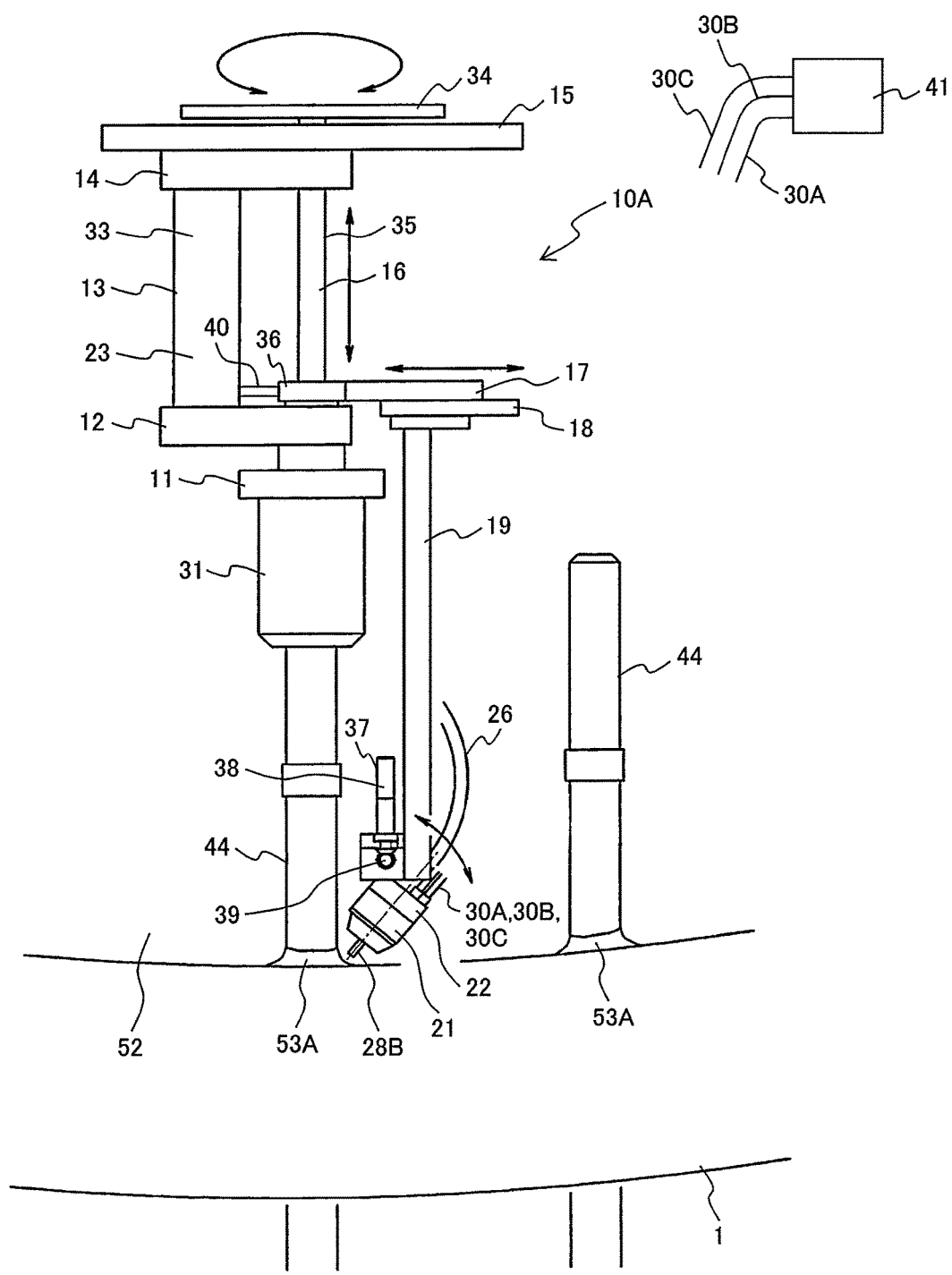
FIG. 14 is an explanatory drawing showing a state of a powder laser welding head attached to an in-core guide tube to repair a welded portion of the in-core guide tube and a bottom head of a reactor pressure vessel by a prevention maintenance method of a reactor internal of a nuclear power plant which is applied to a pressurized water nuclear power plant according to embodiment 2 which is another preferred embodiment of the present invention.

In the prevention maintenance method of the reactor internal of the nuclear power plant of the present embodiment, a powder laser welding apparatus 10A shown in FIG. 14 is used. The powder laser welding apparatus 10A has a constitution where a seating member 31 is attached to the powder laser welding apparatus 10 used in embodiment 1. The other structure of the powder laser welding apparatus 10A is the same as that of the powder laser welding apparatus 10. The outside diameter and inside diameter of a bottom mounted instrumentation nozzle 44 are smaller than the outside diameter and inside diameter of the control rod drive mechanism housing 3 on which the powder laser welding apparatus 10 is seated. For this reason, it is difficult to make the powder laser welding apparatus 10 seated at the upper end of the bottom mounted instrumentation nozzle 44 so that it will be held by the bottom mounted instrumentation nozzle 44. The powder laser welding apparatus 10A includes a seating member 31 so that the powder laser welding apparatus 10 is seated easily at the upper end of the bottom mounted instrumentation nozzle 44 and is held easily by the bottom mounted instrumentation nozzle 44. The seating member 31 is smaller in the outside diameter than the seating member 11 and includes the projection inserted into the bottom mounted instrumentation nozzle 44 for preventing the powder laser welding apparatus 10A from tumble on the under surface of the seating member 11. The seating member 31 is attached to the under surface of the seating member 11. The first motor which is a rotation apparatus of the support body 13 is attached to the under surface of the seating member 11 and is disposed inside the seating member 31.

In the prevention and maintenance executed for the welding portion 53A between the bottom mounted instrumentation nozzle 44 and the bottom (bottom head) of the reactor pressure vessel 1 in the pressurized water nuclear power plant, the operations described in the paragraphs 0031 to 0051 of Japanese Patent Laid-open No. 2011-52966 (the paragraphs 0053 to 0080 of US2011/0051878A1) are performed. In the present embodiment, the common access apparatus is hanged by the ceiling crane, descends into the reactor pressure vessel 1 filled with water, and is set on the inner surface of the bottom of the reactor pressure vessel 1 (refer to FIGS. 2 and 3 of Japanese Patent Laid-open No. 2011-52966). The cover apparatus to which the guide pipe is attached for covering the common access apparatus is hanged by the ceiling crane, descends in the reactor pressure vessel 1, and is set on the inner surface of the bottom of the reactor pressure vessel 1 (refer to FIGS. 4 and 7 of Japanese Patent Laid-open No. 2011-52966). Water is removed from a zone in which the common access apparatus disposed and which exists below the cover apparatus in the reactor pressure vessel 1 and the zone is set in the aerial environment (refer to FIGS. 10 and 11 of Japanese Patent Laid-open No. 2011-52966). The water pressure above the cover apparatus existing in the reactor pressure vessel 1 is added to the cover apparatus by forming the aerial environment below the cover apparatus in the reactor pressure vessel 1, so that the cover apparatus is pressed to the inner surface of the bottom of the reactor pressure vessel 1 and the sealing property between the cover apparatus and the inner surface of the bottom of the reactor pressure vessel 1 is improved. The powder laser welding apparatus 10A, the penetrant inspection apparatus, and the grinder are fallen by hanging through the guide pipe, and are set to the metal fitting members attached to the arm of the common access apparatus.

Thereafter, the operation of each process of steps S4A to S4E executed in embodiment 1 is executed in order. The chemical decontamination (step S4A) of the inner surface of the bottom of the reactor pressure vessel 1 is executed and using the penetrant inspection apparatus, the inspection of the surface of the welding portion 53A between a certain bottom mounted instrumentation nozzle 44 and the bottom of the reactor pressure vessel 1 is executed (step S4B).

Next, the welding operation is executed (step S4C). The powder laser welding apparatus 10A is permitted to descend from the arm and the seating member 31 of the powder laser welding apparatus 10A is set at the upper end of a certain bottom mounted instrumentation nozzle 44 joined to the bottom of the reactor pressure vessel 1 by the welding portion 53A to be subjected to the build-up welding. When no crack is found in the welding portion 53A by the surface inspection at step S4B, the central axis of the powder laser welding head 21 is inclined, for example, at 50° relative to the surface of the welding portion 53A subjected to the build-up welding. Thereafter, similarly to embodiment 1, the laser 28B discharged from the laser outlet of the powder laser welding head 21 is irradiated on the surface of the welding portion 53A, and the metallic powder (for example, powder of the Inconel 52 alloy) which is a filler metal is fed to the surface of the welded portion 53A melted by the laser 28B from the metallic powder feed apparatus 41 through the powder feed paths 29A, 29B, and 29C. As a consequence, the build-up welding is performed to the surface of the welded portion 53A. Similarly to embodiment 1, the arm 17 is rotated by rotating the support body 13 and the rotator 16, and the powder laser welding head 21 is also rotated around the welding portion 53A of the bottom mounted instrumentation nozzle 44 subjected to the build-up welding. As a result, the build-up welding is performed over the entire periphery of the welding portion between the bottom mounted instrumentation nozzle 44 and the bottom of the reactor pressure vessel 1.

After completion of the build-up welding, the grinding of the surface the build-up welding portion on the welding portion 53A at step S4D and the inspection of the surface of the build-up welding portion at step S4E are executed. Each operation at steps S4B to S4E is repeated and the build-up welding for each welding portion 53A between all the bottom mounted instrumentation nozzles 44 attached to the bottom of the reactor pressure vessel 1 and the reactor pressure vessel 1 is executed in order. After completion of these build-up welding operations, water is fed to the zone in which the common access apparatus disposed and which exists below the cover apparatus in the reactor pressure vessel 1, and the zone is filled with water. Thereafter, the cover apparatus and the common access apparatus are pulled up by the ceiling crane in order and are transferred outside the reactor pressure vessel 1. This completes the prevention maintenance method of the present embodiment.

The present embodiment can obtain each effect generated in embodiment 1.

Embodiment 3

The prevention maintenance method of the reactor internal of the nuclear power plant according to embodiment 3 which is still another preferred embodiment of the present invention will be explained below. The prevention maintenance method of the reactor internal of the present embodiment is applied to the reactor internal existing in the reactor pressure vessel of the boiling water nuclear power plant. In embodiment 1, the reactor internal which is a prevention maintenance object is the stub tube 2 which is a tubular structure or the control rod drive mechanism housing 3, though in the present embodiment, the prevention maintenance is executed for the welding portion of the in-core monitor housing 4 which is a tubular structure and the bottom of the reactor pressure vessel 1. The in-core monitor housing 4 is shown in FIG. 3.

In the prevention maintenance method of the reactor internal of the nuclear power plant of the present embodiment, the aforementioned powder laser welding apparatus 10A used in embodiment 2 shown in FIG. 14 is used.

The prevention maintenance method in the present embodiment will be explained. Similarly to embodiment 1, the operation of each process at steps S1 to S3 is executed. At step S4, similarly to embodiment 1, the operation of each process at steps S4A to S4E is executed in order. The welding operation at step S4C, concretely, the build-up welding on the surface of the welding portion between the in-core monitor housing 4 and the bottom of the reactor pressure vessel 1 will be explained below.

When the powder laser welding apparatus 10A descending in the guide pipe and transferred is seated at an upper end of the in-core monitor housing 4 subjected to the build-up welding, the powder laser welding head 21 and the support member 19 are disposed between the in-core monitor housing 4 on which the powder laser welding apparatus 10 seated and another control rod drive mechanism housing 3 adjacent to in-core monitor housing 4. When no crack is found in the welding portion between the in-core monitor housing 4 and the bottom of the reactor pressure vessel 1 by the surface inspection at step S4B, the central axis of the powder laser welding head 21 is inclined, for example, at 50° relative to the surface of the welding portion subjected to the build-up welding. Thereafter, similarly to embodiment 1, the laser 28 discharged from the laser outlet of the powder laser welding head 21 is irradiated on the surface of the welding portion, and the metallic powder (for example, powder of the Inconel 52 alloy) which is a filler metal is fed to the surface of the welding portion melted by the laser 28 and the build-up welding is performed to the surface of the welding portion. The arm 17 is rotated by rotating the rotary shaft 35, and the powder laser welding head 21 is rotated around the welding portion subjected to the build-up welding. As a result, the build-up welding is performed over the entire periphery of the welding portion between the in-core monitor housing 4 and the bottom of the reactor pressure vessel 1.

After completion of the build-up welding, the grinding of the surface of the build-up welding portion at step S4D and the inspection of the surface of the build-up welding portion after the build-up welding at step S4E are executed. Each operation at steps S4B to S4E is repeated and the build-up welding for each welding portion between all the in-core monitor housing 4 attached to the bottom of the reactor pressure vessel 1 and the reactor pressure vessel 1 is executed in order. After completion of these build-up welding operations, each operation at steps S5 to S7 is performed in order and the prevention maintenance method of the present embodiment finishes.

The present embodiment can obtain each effect generated in embodiment 1.

Embodiment 4

Figure 15:
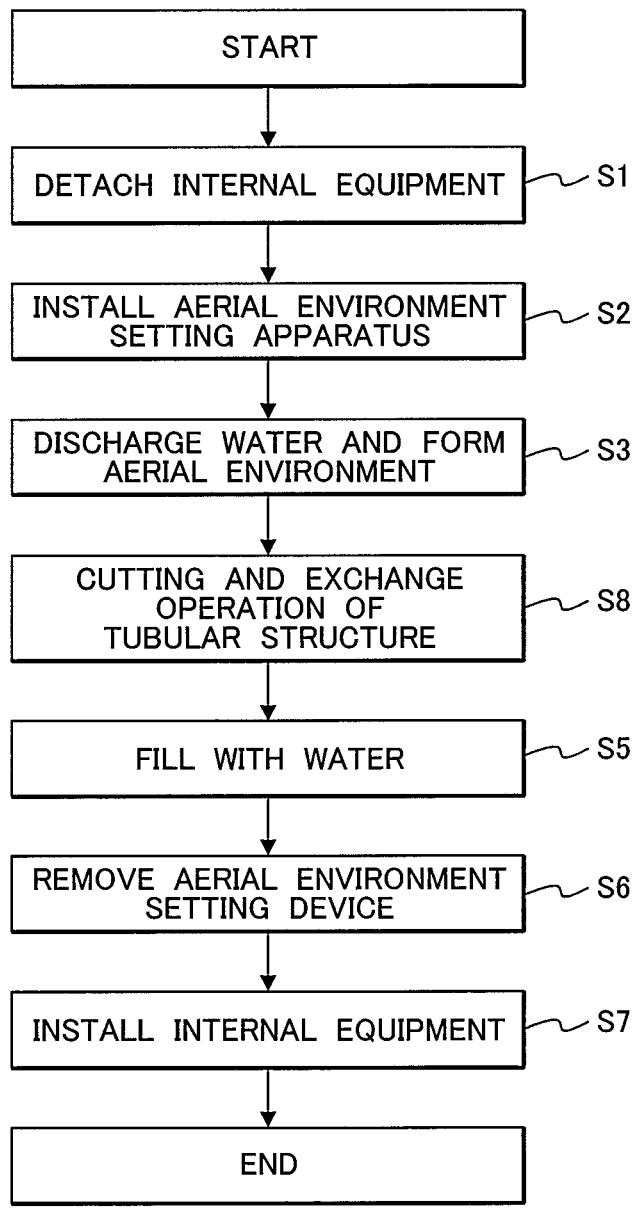
FIG. 15 is a flow chart showing a procedure of a cutting method of a reactor internal of a nuclear power plant which is applied to a boiling water nuclear power plant according to embodiment 4 which is other preferred embodiment of the present invention.
Figure 16:
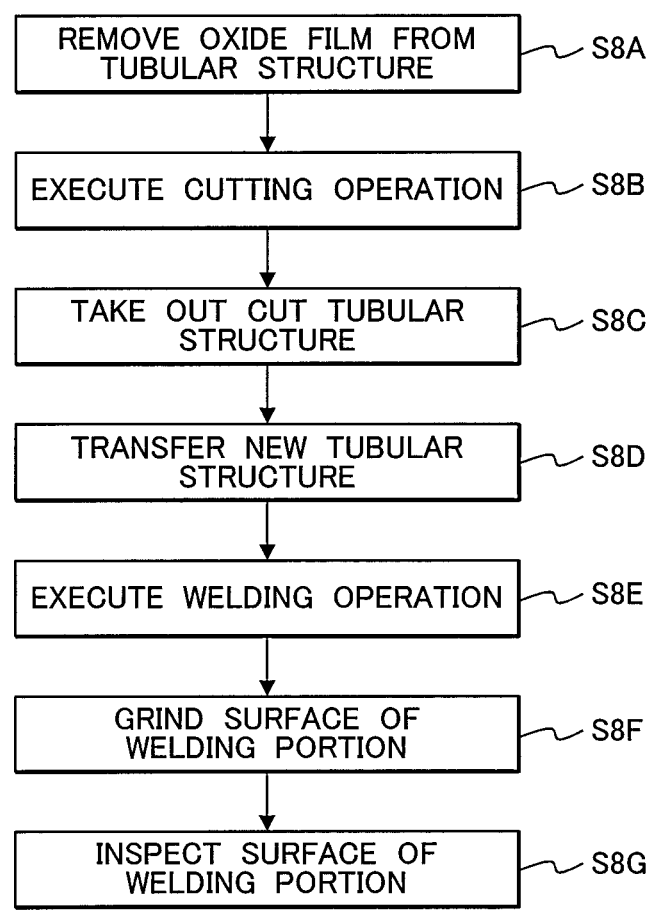
FIG. 16 is a flow chart showing a detailed procedure of step S8 shown in FIG. 15.

The cutting method of the reactor internal of the nuclear power plant according to embodiment 4 which is other preferred embodiment of the present invention will be explained by referring to FIGS. 15, 16, and 17. The cutting method of the reactor internal of the present embodiment is applied to the reactor internal existing in the reactor pressure vessel of the boiling water nuclear power plant.

Figure 17:
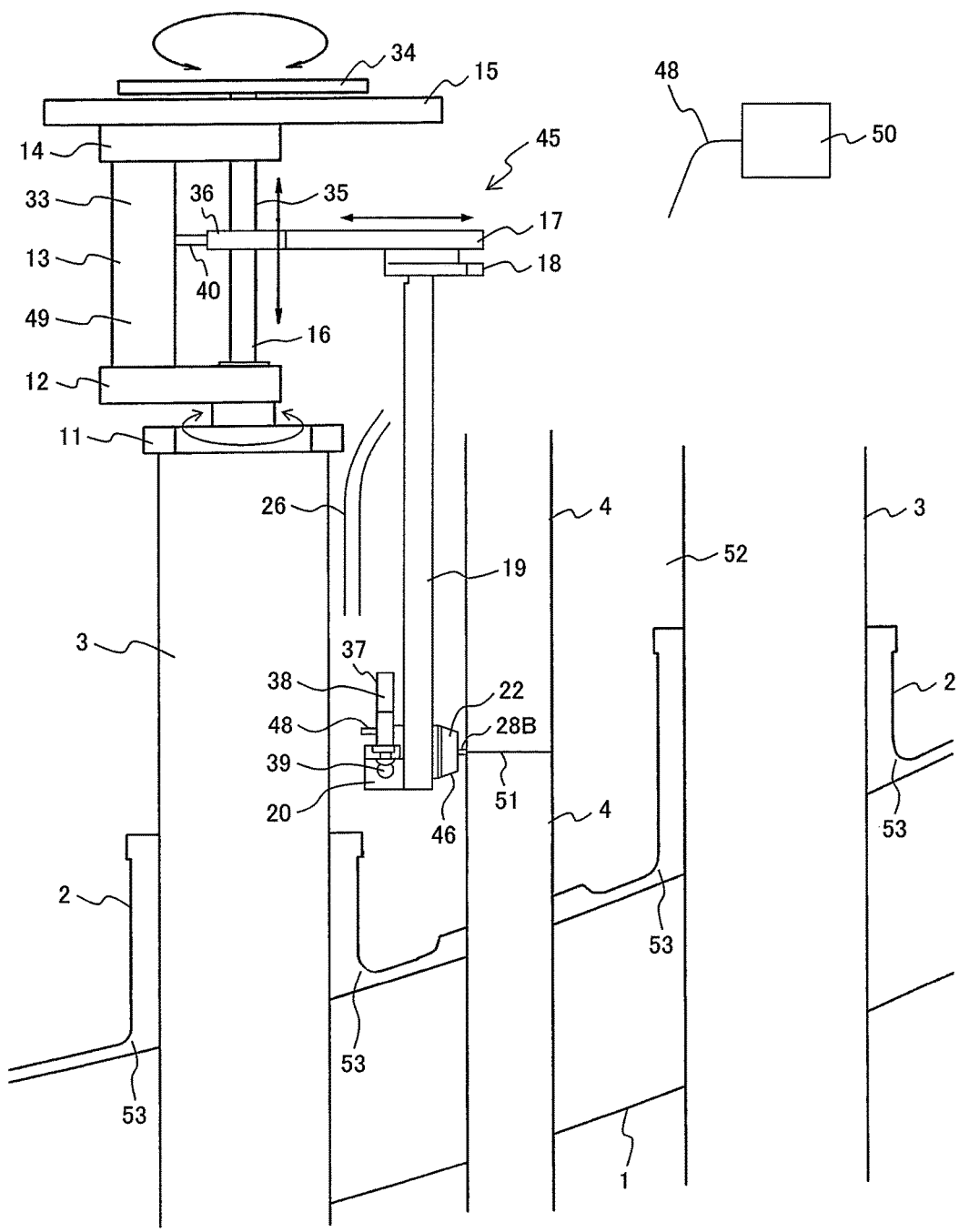
FIG. 17 is an explanatory drawing showing a state of a laser cutting apparatus attached to a control rod drive mechanism housing to cut off an in-core monitor housing in cutting operation shown in FIG. 16.
Figure 18:
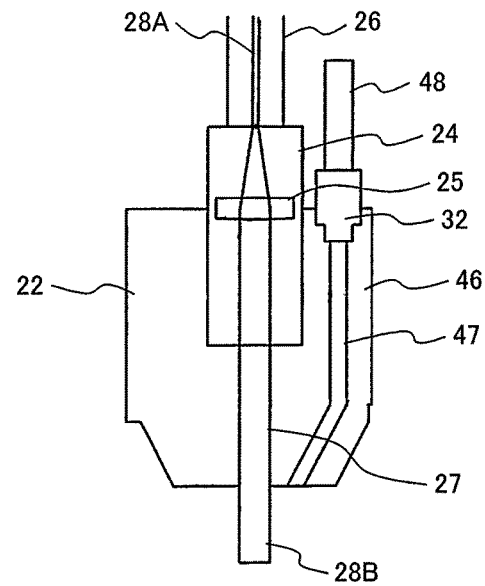
FIG. 18 is a detailed structural diagram of a laser working head shown in FIG. 17.

In the cutting method of the reactor internal of the present embodiment, a laser cutting apparatus 45 shown in FIG. 17 is used. The laser cutting apparatus 45 includes a laser cutting head (cutting head) 46, a cutting head scanning apparatus 49, and a gas feed apparatus 50. The laser cutting head 46 has a structure where in the powder laser welding head 21 of the powder laser welding apparatus 10, one gas feed path 47 is formed in the head body 22 in place of the powder feed paths 29A, 29B, and 29C (refer to FIG. 18). The other structure of the laser cutting head 46 is the same as the structure of the powder laser welding head 21. A gas injection outlet of the gas feed path 47 is formed together with the laser outlet at an end face of a head body 22. A gas feed hose 48 connected to the gas feed apparatus 50 is attached to the head body 22 by metal fitting member 32. A cutting head scanning apparatus 49 has the same structure as that of a welding head scanning apparatus 23 of the powder laser welding apparatus 10. The laser cutting head 46 includes only the collimate lens 25 as a lens and includes no condensing lens.

The cutting method of the reactor internal of the nuclear power plant of the present embodiment will be explained below by referring to FIGS. 15 and 16. The cutting method of the reactor internal of the present embodiment has the procedures of executing the cutting and exchanging operations of the tubular structure (step S8) in place of the repair and the prevention maintenance operation (step S4) among the steps S1 to S7 executed by the prevention maintenance method of the reactor internal according to embodiment 1.

In the present embodiment, after the operation of the boiling water nuclear power plant is stopped, similarly to embodiment 1, the removal and transfer of the internal equipment in the reactor pressure vessel 1 (step S1), the installation of the aerial environment setting apparatus (step S2), and discharge of the water from the reactor pressure vessel and the setting of the aerial environment (step S3) are executed in order.

Thereafter, the cutting and exchanging operations of the tubular structure are executed (step S8). The cutting and exchanging operations of the tubular structure include each process of steps S8A to S8G shown in FIG. 16. The cutting and exchanging operations of the tubular structure will be explained in detail by referring to FIG. 16.

The oxide film formed on the surface of the tubular structure is removed (step S8A). In step S8, the oxide film including the radioactive nuclide formed on the surfaces of the in-core monitor housing 4 which is a tubular structure and a cutting object and a plurality of control rod drive mechanism housings 3 to which the laser cutting apparatus 45 is attached, these control rod drive mechanism housings 3 being adjacent to it, is removed by the decontamination operation (the grinding operation or chemical decontamination) similarly to step S4A in embodiment 1.

The cutting operation of the tubular structure is executed (step S8B). The laser cutting apparatus 45 is used in the cutting operation. The laser cutting apparatus 45 is hanged by the ceiling crane similarly to the powder laser welding apparatus 10 at step S4C and descends down in the guide pipe up to the position of the upper end of one control rod drive mechanism housing 3 (for example, the control rod drive mechanism housing 3A shown in FIG. 19) adjacent to the in-core monitor housing 4 being the cutting object. The seating member 11 of the laser cutting apparatus 45 is seated on the upper end of the control rod drive mechanism housing 3. The control rod drive mechanism housing 3 on which the laser cutting apparatus 45 is seated is one of four control rod drive mechanism housings 3 adjacent to the in-core monitor housing 4 being the cutting object. The gas feed apparatus 50 of the laser cutting apparatus 45 is installed on the operation floor in the reactor building.

The laser cutting head 46 is moved up to the position A (refer to FIG. 19) by driving the first motor, second motor, and third motor, and the laser outlet of the laser cutting head 46 is permitted to face a cutting position 51 of the in-core monitor housing 4. Since the in-core monitor housing 4 is cut off in the horizontal direction, the laser cutting head 46 is rotated in the axial direction of the control rod drive mechanism housing 3 by driving the third motor 38 of the swing drive apparatus 37 so as to set the laser path 27 horizontally. When the laser path 27 is set horizontally, the drive of the third motor 38 is stopped.

Next, the laser oscillator is operated and the laser 28A (power density: 44 kW/mm$^2$) with power of 1 kW generated by the laser oscillator enters the optical fiber 26. The laser 28A is spread by the collimator lens 25, becomes a laser 28B with a spot diameter D of 5.4 mm of a parallel beam, and enters the laser path 27. The laser 28B is irradiated from the laser outlet toward a cutting position 51 of the in-core monitor housing 4 which is a cutting object. In the position where the laser 28B is irradiated, the in-core monitor housing 4 is melted. In the position where the in-core monitor housing 4 is melted by the irradiation of the laser 28B, gas (for example, air) pressurized from the gas feed path 47 is jetted. This air is pressurized by the gas feed apparatus (for example, a blower) 50 and is fed to the gas feed path 47 through the gas feed hose 48. The pressurized air discharged from the gas injection outlet of the gas feed path 47 is jetted toward the melted position of the in-core monitor housing 4 and the melted metal of the in-core monitor housing 4 is blown off.

The first motor is driven while performing the irradiation of the laser 28B from the laser outlet and the jetting of pressurized air from the gas injection outlet. As a result, the support body 13 and the rotator 16 are rotated and the arm 17 is rotated in a predetermined angle in the horizontal direction around the rotary shaft 35. As a result, the cutting head 46 positioned in the position A (refer to FIG. 19), the cutting head 46 including in the laser cutting apparatus 45 seated in the control rod drive mechanism housing 3A, rotates horizontally in a predetermined angle around the rotary shaft 35 of the laser cutting apparatus 45 seated in the control rod drive mechanism housing 3A (refer to FIG. 19). Therefore, while melting the in-core monitor housing 4 by the laser 28B within the range of 45° each, that is, 90° in total (¼ of the overall periphery of the in-core monitor housing 4) on both sides in the horizontal direction of the straight line connecting a center of the control rod drive mechanism housing 3A and a center of the in-core monitor housing 4 which is a cutting object, the melted metal of the in-core monitor housing 4 is blown off by the pressurized air. After all, ¼ of the overall periphery of the in-core monitor housing 4 is cut off. The wire hanged from another travelling carriage installed on the ceiling crane is attached to an upper end portion of the in-core monitor housing 4.

After completion of the cutting of ¼ of the overall periphery of the in-core monitor housing 4 by the cutting head 46 positioned in the position A (refer to FIG. 19), the laser cutting apparatus 45 seated on the control rod drive mechanism housing 3A is hanged up by the ceiling crane through the guide pipe disposed right above the control rod drive mechanism housing 3A and reach above the radiation shielding cover attached to an upper end portion of the reactor pressure vessel 1. In the present embodiment, four guide pipes are separately disposed right above four control rod drive mechanism housings 3 adjacent to the in-core monitor housing 4 being the cutting object and are attached to the radiation shielding cover at step S2. The laser cutting apparatus 45 which reached above the radiation shielding cover is come down in the guide pipe disposed right above the control rod drive mechanism housing 3B positioned in the neighborhood and is seated on the upper end of the control rod drive mechanism housing 3B. The first motor, second motor, and third motor 38 are driven, and the laser cutting head 46 is moved up to the position B (refer to FIG. 19), and the laser outlet of the laser cutting head 46 is permitted to face the cutting position 51 of the in-core monitor housing 4. While performing the irradiation of the laser 28B to the in-core monitor housing 4 and the jetting of pressurized air, the laser cutting head 46 arranged in the position B is rotated along the outside surface of the control rod drive mechanism housing 3B within the range of 45° each, that is, 90° in total (¼ of the overall periphery of the in-core monitor housing 4) on both sides in the horizontal direction of the straight line connecting a center of the control rod drive mechanism housing 3B and the center of the in-core monitor housing 4 which is a cutting object. Therefore, ¼ of the overall periphery aforementioned of the in-core monitor housing 4 facing the outside surface of the control rod drive mechanism housing 3B is cut off.

After completion of the cutting of the in-core monitor housing 4 by the cutting head 46 positioned in the position B (refer to FIG. 19), similarly, the laser cutting apparatus 45 seated on the control rod drive mechanism housing 3B is hanged up by the ceiling crane and is seated in order at the respective upper ends of the control rod drive mechanism housings 3C and 3D positioned in the neighborhood. While performing the irradiation of the laser 28B and the jetting of the pressurized air from the laser cutting head 46, the laser cutting head 46 disposed in each the positions C and D is rotated along the outside surface of each the control rod drive mechanism housings 3C and 3D. Therefore, ½ of the remainder of the overall periphery of the in-core monitor housing 4 is cut off and the cutting of the in-core monitor housing 4 which is to be cut off finishes.

After completion of the cutting of the in-core monitor housing 4, the laser cutting apparatus 45 seated on the upper end of the control rod drive mechanism housing 3D is pulled up by the ceiling crane through the guide pipe, is taken out from the reactor pressure vessel 1, and is transferred up to the operation floor.

The cut tubular structure is taken out from the reactor pressure vessel (step S8C). The wire hanged down from another travelling carriage of the ceiling crane is wound and the in-core monitor housing 4, which is a cut tubular structure, above the cutting position 51 is pulled up through the guide pipe and is taken out from the reactor pressure vessel 1.

A new tubular structure is transferred (step S8D). A groove portion in welding is formed at the upper end of the remainder of the cut in-core monitor housing 4 attached to the reactor pressure vessel 1 before an new in-core monitor housing 4A is transferred up to the upper end position of the remainder of the cut in-core monitor housing 4. The groove portion is formed as shown below. The upper end portion of the remainder of the in-core monitor housing 4 which is cut off is worked in order to form the groove portion by the cutting apparatus hanged down by the ceiling crane and descending through the guide pipe.

Figure 20:
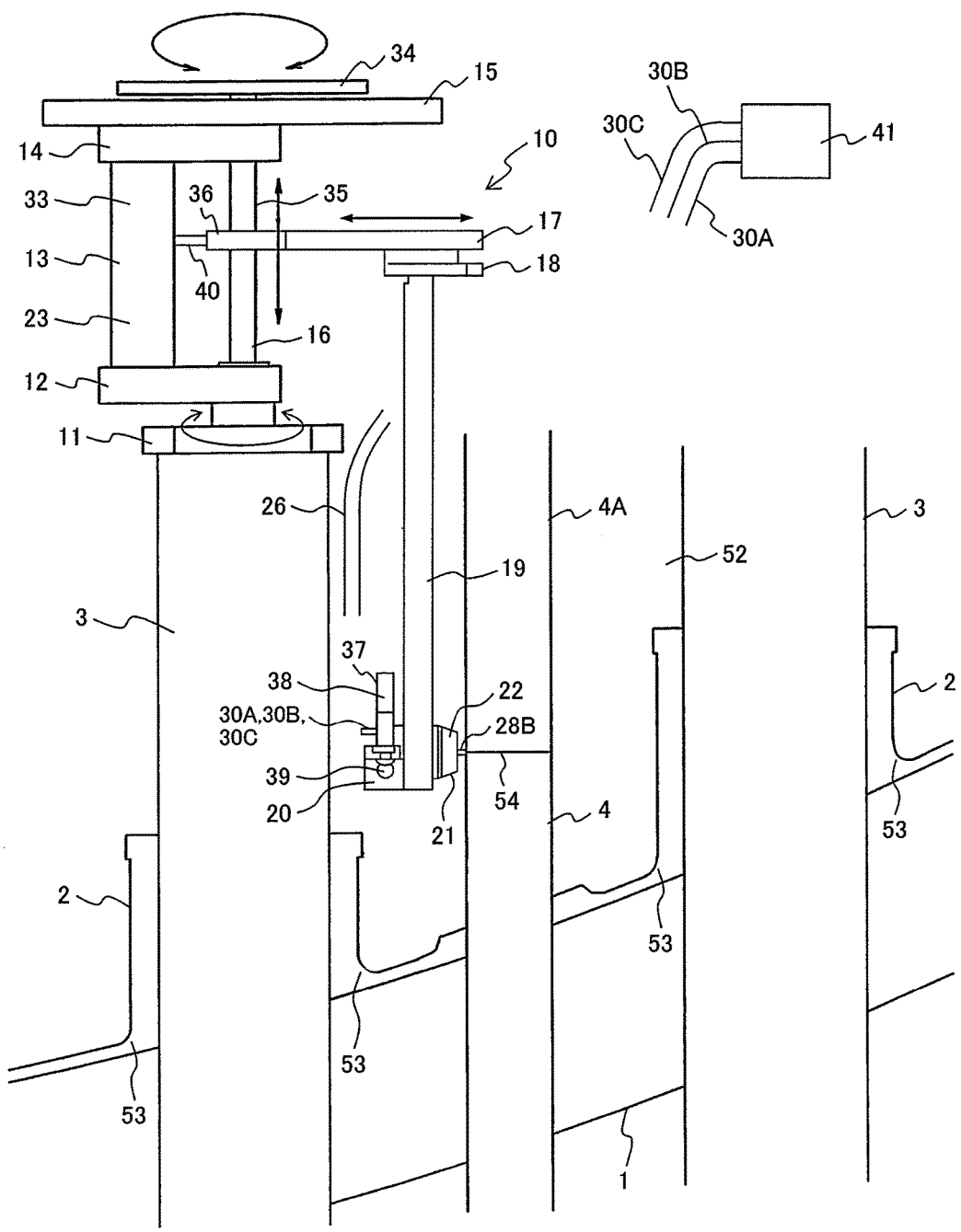
FIG. 20 is an explanatory drawing showing a state of a powder laser welding apparatus attached to a control rod drive mechanism housing to weld an in-core monitor housing in welding operation shown in FIG. 16.

The new in-core monitor housing 4A is held by the holding apparatus of a manipulator attached to the fuel exchange apparatus (not shown) moving on the operation floor in the reactor building, descends through the guide pipe, and is placed on the upper end of the remainder of the cut in-core monitor housing 4 with the groove portion worked by the cutting apparatus (refer to FIG. 20). The center of the new in-core monitor housing 4A and the center of the in-core monitor housing 4 attached to the reactor pressure vessel 1 coincide with each other and a central axial through these centers are extended upward in a straight line.

Figure 21:
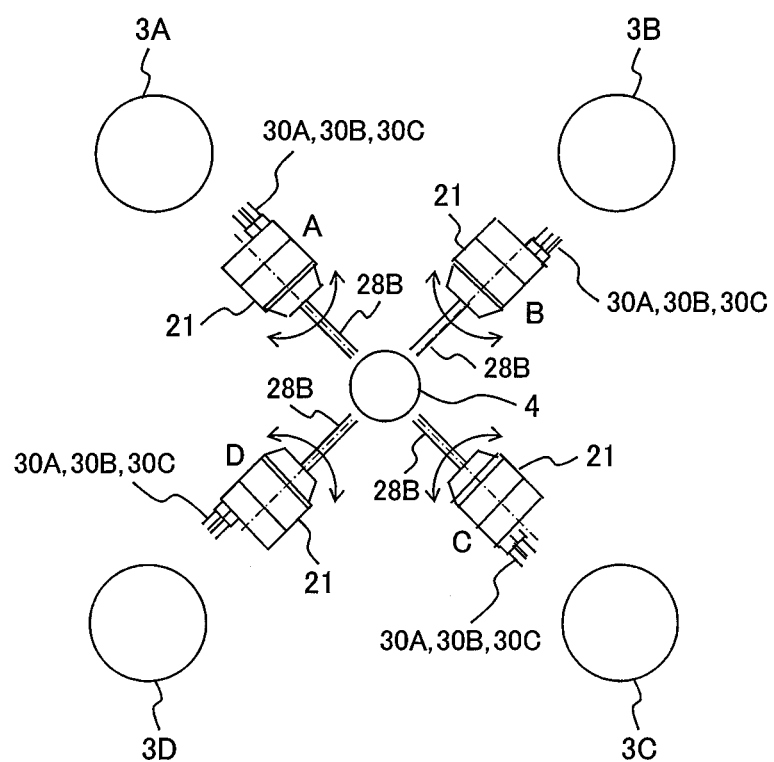
FIG. 21 is an explanatory drawing showing a state of welding an in-core monitor housing using a powder laser welding apparatus shown in FIG. 20.

The welding operation for the tubular structure is executed (step S8E). The powder laser welding apparatus 10 is hanged down by the ceiling crane and is seated on the upper end of one control rod drive mechanism housing 3 (among the four control rod drive mechanism housings 3A to 3D (refer to FIG. 21) in the neighborhood of the cut in-core monitor housing 4, for example, the control rod drive mechanism housing 3A). The first motor, second motor, and third motor 38 are driven, and the laser welding head 21 is moved up to the position A (refer to FIG. 21), and the laser outlet of the laser welding head 21 is permitted to face the welding positions 54 of the in-core monitor housings 4 and 4A. The laser welding head 21 is rotated in the axial direction of the control rod drive mechanism housing 3 by driving the third motor 38 of the swing drive apparatus 37 so as to set the laser path 27 horizontally. When the laser path 27 becomes horizontal, the drive of the third motor 38 is stopped.

The laser 28A (power density: 44 W/mm$^2$) with power of 1 kW generated by the laser oscillator enters the laser path 27 through the optical fiber 26 and the collimator lens. The laser 28B entering the laser path 27 is a parallel beam and the spot diameter D is 5.4 mm. The laser 28B is irradiated to the groove portions in the welding positions 54 of the in-core monitor housings 4 and 4A to melt the in-core monitor housings 4 and 4A.

The metallic powder (for example, powder of the Inconel 52 alloy) which is a filler metal is fed to the powder feed paths 29A, 29B, and 29C of the head body 22 through the powder feed hoses 30A, 30B, and 30C, respectively, from the metallic powder feed apparatus 41. The total amount of the metallic powder fed to the powder feed paths 29A, 29B, and 29C is, for example, 0.17 g/W·s. The metallic powder is jetted from each powder injection outlet of the powder feed paths 29A, 29B, and 29C toward the welding place of the aforementioned groove portion and is melted in the fusion zone.

Figure 19:
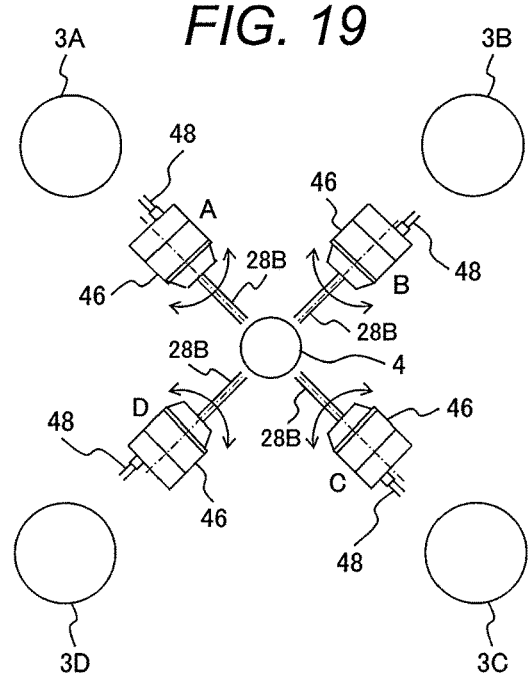
FIG. 19 is an explanatory drawing showing a state of cutting an in-core monitor housing using a laser cutting apparatus shown in FIG. 17.

While driving the first motor, performing the irradiation of the laser 28B to the groove portion and jetting the metallic powder, the laser welding head 21 is rotated horizontally in a predetermined angle around the rotary shaft 35 of the laser cutting apparatus 45 seated on the control rod drive mechanism housing 3A (refer to FIG. 19). Therefore, while the laser welding head 21 existing at the position A moves along the outside surface of the control rod drive mechanism housing 3A, the groove portion is melted by the laser 28B, and the metallic powder is melted in the fusion zone of the groove portion within the range of 45° each, that is, 90° in total (¼ of the overall periphery of the groove portion in the welding position 54) on both sides in the horizontal direction of the straight line connecting the center of the control rod drive mechanism housing 3A and the center of the in-core monitor housing 4 which is a welding object. The range of ¼ of the overall periphery of the groove portion is opposite to the outside surface of the control rod drive mechanism housing 3A. The in-core monitor housing 4 and the in-core monitor housing 4A are welded in the range of ¼ of the overall periphery of the groove portion in the welding position 54. Multi-layer welding is performed in the groove portion, so that the normal rotation and reverse rotation of the first motor are performed alternately and the laser welding head 21 for discharging the laser 28B and metallic powder is allowed to move back and forth within the range of ¼ of the overall periphery of the groove portion.

After completion of the predetermined multi-layer welding within the range of ¼ of the overall periphery of the groove portion, the powder laser welding apparatus 10 seated on the control rod drive mechanism housing 3A is hanged up by the ceiling crane and is seated on the upper ends of the respective control rod drive mechanism housings 3 in order of the control rod drive mechanism housings 3C, 3B, and 3D as with the laser cutting apparatus 45. The laser welding head 21 is arranged in order in the positions C, B, and D. While the laser welding head 21 for discharging the laser 28B and metallic powder is moved along the outside surface of the control rod drive mechanism housing 3A within the range of each ¼ of the overall periphery of the groove portion opposite to each outside surface of the control rod drive mechanism housings 3C, 3B, and 3D, similarly to the case when the laser welding head 21 is arranged in the position A, the welding of the in-core monitor housing 4 and the in-core monitor housing 4A in the welding position 54 is performed.

After completion of the welding of the overall periphery of the in-core monitor housing 4 and the in-core monitor housing 4A in the welding position 54, the powder laser welding apparatus 10 seated on the upper end of the control rod drive mechanism housing 3D is pulled up by the ceiling crane through the guide pipe, is taken out from the reactor pressure vessel 1, and is transferred up to the operation floor. The holding apparatus for holding the in-core monitor housing 4A is also raised up to the position of the fuel exchange apparatus by the operation of the manipulator.

The grinding of the welding portion surface (step S8F) and the surface inspection (step S8G) after welding are executed. The grinding and the surface inspection are executed in sequence for the outside surface of the welding portion between the in-core monitor housing 4 and the in-core monitor housing 4A. The grinding of the welding portion surface at step S8F is performed similarly to step S4D of embodiment 1 and the surface inspection after the welding at step S8G is performed similarly to step S4E of embodiment 1.

After completion of the surface inspection after welding at step S8G, each process at steps S5, S6, and S7 executed in embodiment 1 is executed in sequence. When the process at step S7 finishes, all the processes of the cutting method of the reactor internal of the nuclear power plant of the present embodiment finish.

In the welding of the in-core monitor housing 4 and the in-core monitor housing 4A of the present embodiment, each effect generated in embodiment 1 can be obtained. Further, the laser cutting head 46 of the laser cutting apparatus 45 also includes only the collimate lens 25 as a lens, so that similarly to the laser welding head 21, the length of the laser cutting head 46 can be shortened. Therefore, the cutting of the in-core monitor housing 4 facing a narrow portion can be performed easily and the time required for the cutting operation can be shortened. Also at the time of cutting operation, there is no need to fit the cutting object to the focal position of the condensing lens, so that the cutting operation of the cutting object becomes easy.

REFERENCE SIGNS LIST

1: reactor pressure vessel, 2: stub tube, 3: control rod drive mechanism housing, 4: in-core monitor housing, 10, 10A: laser welding apparatus, 11, 31: seating member, 13: support body, 15: pedestal, 16: rotator, 17: arm, 18: horizontal direction drive apparatus, 19: support member, 20: head holding member, 21: powder laser welding head, 22: head body, 23: welding head scanning apparatus, 24: lens housing, 25: collimate lens, 26: optical fiber, 28: laser, 29A, 29B: powder feed path, 35: rotary shaft, 36: hoisting table, 41: metallic powder feed apparatus, 44: bottom mounted instrumentation nozzle, 45: laser cutting apparatus, 46: laser cutting head, 47: gas feed path, 49: cutting head scanning apparatus, 50: gas feed apparatus.

What is claimed is:

1. A laser welding apparatus comprising:
a welding head including a head body, and a collimate lens opposite to an end face of an optical fiber connected to the head body and installed in the head body; and
a welding head scanning apparatus of scanning the welding head;
wherein a laser path of introducing a laser emitted from the optical fiber and passing through the collimate lens is formed in the head body;
wherein the welding head includes no lenses except the collimate lens;
wherein a laser outlet of the laser path is formed in an end portion of the head body;
wherein the laser outlet has a size that allows the laser, which is a parallel beam converted by the collimate lens, to pass through the laser outlet;
wherein a powder feed path of introducing metallic powder which is a filler metal is formed in the head body, the powder feed path being contained entirely within the head body; and
wherein an injection outlet of the powder feed path is formed in the end portion of the head body.

2. The laser welding apparatus according to claim 1, wherein the powder feed path includes a first portion parallel to the laser path and a second portion arranged at an acute angle to the laser path.

* * * * *